United States Patent
Jadhav et al.

(10) Patent No.: US 10,783,569 B2
(45) Date of Patent: Sep. 22, 2020

(54) METHOD, MEDIA, AND SYSTEM FOR CLUSTER PRUNING OF ITEM LISTINGS

(71) Applicant: Facebook, Inc., Menlo Park, CA (US)

(72) Inventors: Apurva Rameshchandra Jadhav, Mountain View, CA (US); Shashikant Khandelwal, Mountain View, CA (US); Gurpreetsingh Baljeetsingh Sachdev, Fremont, CA (US); Nikhil Gupta, Palo Alto, CA (US)

(73) Assignee: Facebook, Inc., Menlo Park, CA (US)

( * ) Notice: Subject to any disclaimer, the term of this patent is extended or adjusted under 35 U.S.C. 154(b) by 599 days.

(21) Appl. No.: 15/384,504

(22) Filed: Dec. 20, 2016

(65) Prior Publication Data

US 2018/0174219 A1 Jun. 21, 2018

(51) Int. Cl.
*G06Q 30/06* (2012.01)
*G06Q 50/00* (2012.01)
*G06Q 30/02* (2012.01)
*G06F 16/28* (2019.01)
*G06F 16/2457* (2019.01)

(52) U.S. Cl.
CPC ... *G06Q 30/0631* (2013.01); *G06F 16/24578* (2019.01); *G06F 16/285* (2019.01); *G06Q 30/0283* (2013.01); *G06Q 50/01* (2013.01)

(58) Field of Classification Search
CPC .................................................. G06Q 30/0631
See application file for complete search history.

(56) References Cited

U.S. PATENT DOCUMENTS

| | | | | |
|---|---|---|---|---|
| 2004/0019536 A1* | 1/2004 | Ashkenazi | ........... | G06Q 10/087 |
| | | | | 705/26.64 |
| 2006/0161569 A1* | 7/2006 | Meyer | .................. | G06F 16/2246 |
| 2008/0115057 A1* | 5/2008 | Grandhi | ................ | G06F 40/103 |
| | | | | 715/272 |
| 2013/0159110 A1* | 6/2013 | Rajaram | ................ | G06Q 30/02 |
| | | | | 705/14.66 |
| 2014/0304220 A1* | 10/2014 | Clendinning | .......... | G06Q 30/02 |
| | | | | 707/607 |
| 2014/0358931 A1* | 12/2014 | Garera | .................. | G06F 16/258 |
| | | | | 707/740 |
| 2016/0092997 A1* | 3/2016 | Shen | ..................... | G06F 16/285 |
| | | | | 705/319 |

OTHER PUBLICATIONS

Shchekotykhin et al., "xCrawl: a high-recall crawling method for Web mining," Nov. 18, 2009, Knowledge and Information Systems 25.2: 303-326 (Year: 2009).*

* cited by examiner

*Primary Examiner* — Brittney N Miller
*Assistant Examiner* — Anna Mae Mitros
(74) *Attorney, Agent, or Firm* — Baker Botts L.L.P.

(57) ABSTRACT

In one embodiment, a method includes receiving a set of normalized attribute values that define a particular item being offered and a corresponding threshold score for each of the normalized attribute values. The method further includes, for each attribute value of a candidate item listing, determining a score for the attribute value based on whether it matches a corresponding normalized attribute value, and determining whether the score is above or below the corresponding threshold score for the normalized attribute value. The method still further includes determining whether the candidate item listing describes the particular item being offered based on a set of rules that define an acceptable number of scores that are allowed to be below the threshold scores.

20 Claims, 13 Drawing Sheets

|   | Noun | Brand | Mpn | Anum | Upc | Title | Term | IsMember |
|---|---|---|---|---|---|---|---|---|
| 701 | L | L | L | L | L | L | L | No |
| 702 | H | H | L | L | L | H | H | No |
| 703 | . | . | . | . | . | . | . | . |
| n | H | L | H | LH | L | LH | LH | Yes |

Input: Product P, Rules Index R having version V

1201: IF product P has a 'cluster id' attribute with version matching version V of rules index R THEN:

return

1202: ELSE:

1203:    Find candidate clusters for product P

1204:    For each candidate cluster C:

1205:        IF P satisfies C's boolean query THEN:

1206:            Score product P against cluster C features (Example: noun score indicates the probability that P has same noun as C)

1207:            Apply decision tree rule on the feature scores

1208:            Finally, check if P's price is within cluster price range (this catches cases where a spammy accessory like camera battery maps to the camera product cluster)

1209:    Return cluster id I of the largest cluster (by number of products mapped to it)

Output: mapped cluster id I

*FIG. 12*

METHOD, MEDIA, AND SYSTEM FOR CLUSTER PRUNING OF ITEM LISTINGS

TECHNICAL FIELD

This disclosure generally relates to clustering products, and specifically rules for clustering products and pruning product clusters.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g., wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

Social-graph analysis views social relationships in terms of network theory consisting of nodes and edges. Nodes represent the individual actors within the networks, and edges represent the relationships between the actors. The resulting graph-based structures are often very complex. There can be many types of nodes and many types of edges for connecting nodes. In its simplest form, a social graph is a map of all of the relevant edges between all the nodes being studied.

A mobile computing device—such as a smartphone, tablet computer, or laptop computer—may include functionality for determining its location, direction, or orientation, such as a GPS receiver, compass, gyroscope, or accelerometer. Such a device may also include functionality for wireless communication, such as BLUETOOTH communication, near-field communication (NFC), or infrared (IR) communication or communication with wireless local area networks (WLANs) or cellular-telephone network. Such a device may also include one or more cameras, scanners, touchscreens, microphones, or speakers. Mobile computing devices may also execute software applications, such as games, web browsers, or social-networking applications. With social-networking applications, users may connect, communicate, and share information with other users in their social networks.

SUMMARY OF PARTICULAR EMBODIMENTS

In certain embodiments, a set of normalized attribute values is received. The attribute values define a particular item being offered. For example, the attribute values can be collected from a set of other item listings that have been determined to be associated with some underlying item. In certain embodiments, the item is a product, service, travel arrangement, experience, hotel, movie, show, or the like. A candidate item listing is processed to determine whether the candidate item listing describes the underlying item. For example, the candidate item listing can be retrieved from an unstructured content page, such as via a web crawling process. Attribute values of the candidate item listing are compared against the set of normalized attribute values to determine whether the candidate item listing should be "clustered" with other item listings that are associated with the underlying item.

In certain embodiments, a match score is determined for each attribute value of a candidate listing item. The match score assesses the relative level of similarity between the normalized attribute values and the candidate listing item attribute value for a particular attribute. For example, a fractional score signifies various levels of matching. The matching scores are compared against threshold score levels to determine whether the candidate item listing attribute indicates a match with the normalized attribute values. In certain embodiments, each candidate item listing match score threshold comparison is compared against a table. In certain embodiments, the candidate item listing match score threshold comparisons are compared with a set of rules that determine whether the candidate item listing is associated with the underlying item. For example, one example rule states that a candidate item listing with five or more attribute matching scores above the threshold score indicates that the candidate item listing is associated with the underlying item, and should be clustered with other listing items that have been determined to be associated with the underlying item.

The embodiments disclosed above are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

FIG. 7 illustrates an example of a table for use in comparing a candidate's matching scores for cluster membership.

FIG. 12 illustrates a pseudo-code example of one implementation of a cluster-mapping algorithm.

DESCRIPTION OF EXAMPLE EMBODIMENTS

Figure 1:
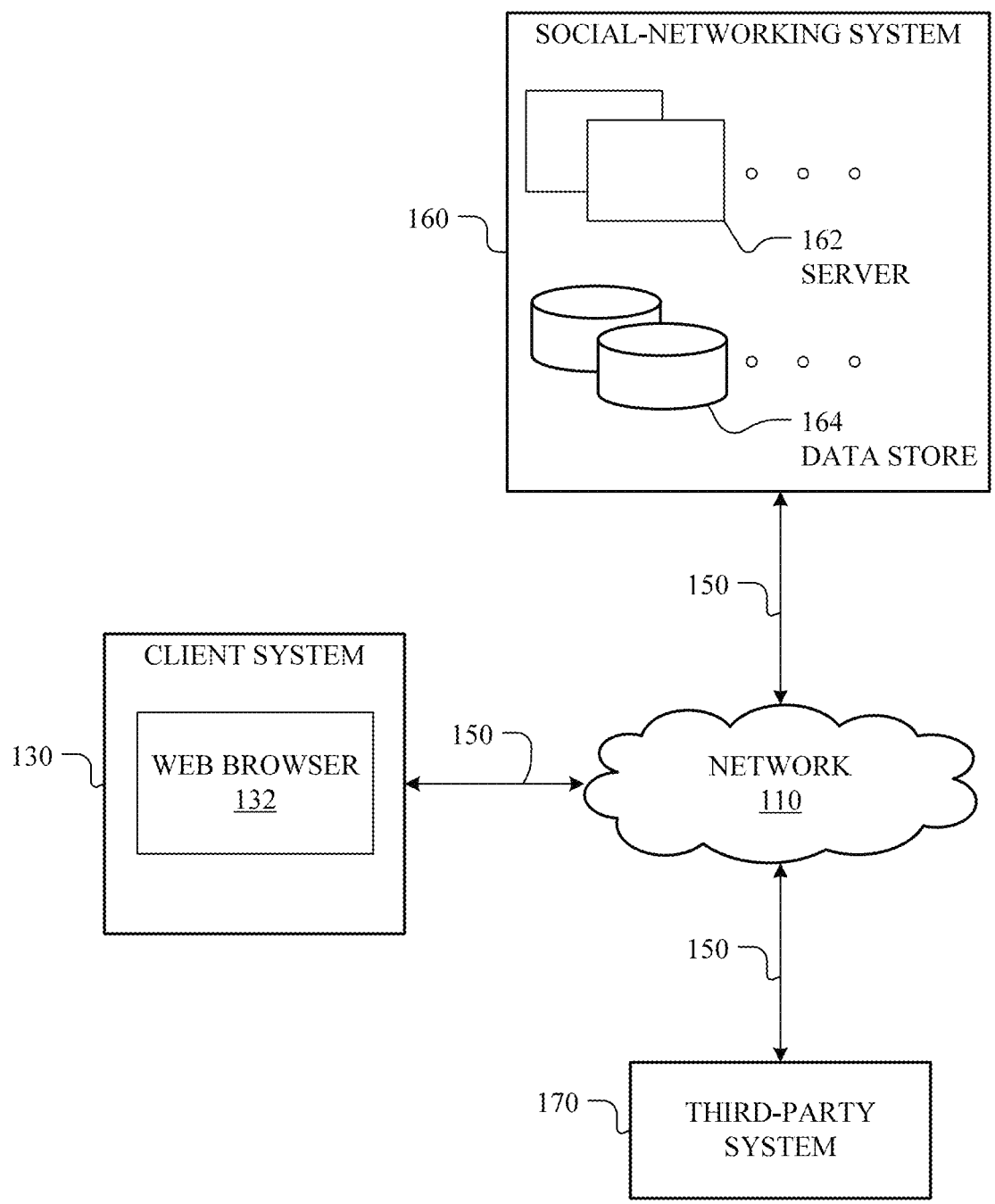
FIG. 1 illustrates an example network environment associated with a social-networking system.

FIG. 1 illustrates an example network environment 100 associated with a social-networking system. Network environment 100 includes a client system 130, a social-networking system 160, and a third-party system 170 connected to each other by a network 110. Although FIG. 1 illustrates a particular arrangement of a client system 130, a social-networking system 160, a third-party system 170, and a network 110, this disclosure contemplates any suitable arrangement of a client system 130, a social-networking system 160, a third-party system 170, and a network 110. As an example and not by way of limitation, two or more of a client system 130, a social-networking system 160, and a third-party system 170 may be connected to each other directly, bypassing a network 110. As another example, two or more of a client system 130, a social-networking system 160, and a third-party system 170 may be physically or logically co-located with each other in whole or in part. Moreover, although FIG. 1 illustrates a particular number of client systems 130, social-networking systems 160, third-party systems 170, and networks 110, this disclosure contemplates any suitable number of client systems 130, social-networking systems 160, third-party systems 170, and networks 110. As an example and not by way of limitation, network environment 100 may include multiple client systems 130, social-networking systems 160, third-party systems 170, and networks 110.

This disclosure contemplates any suitable network 110. As an example and not by way of limitation, one or more portions of a network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. A network 110 may include one or more networks 110.

Links 150 may connect a client system 130, a social-networking system 160, and a third-party system 170 to a communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout a network environment 100. One or more first links 150 may differ in one or more respects from one or more second links 150.

In particular embodiments, a client system 130 may be an electronic device including hardware, software, or embedded logic components or a combination of two or more such components and capable of carrying out the appropriate functionalities implemented or supported by a client system 130. As an example and not by way of limitation, a client system 130 may include a computer system such as a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client systems 130. A client system 130 may enable a network user at a client system 130 to access a network 110. A client system 130 may enable its user to communicate with other users at other client systems 130.

In particular embodiments, a client system 130 may include a web browser 132, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at a client system 130 may enter a Uniform Resource Locator (URL) or other address directing a web browser 132 to a particular server (such as server 162, or a server associated with a third-party system 170), and the web browser 132 may generate a Hyper Text Transfer Protocol (HTTP) request and communicate the HTTP request to server. The server may accept the HTTP request and communicate to a client system 130 one or more Hyper Text Markup Language (HTML) files responsive to the HTTP request. The client system 130 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate. More information on webpages may be found in U.S. patent application Ser. No. 11/856,202, filed 17 Sep. 2007, which is incorporated by reference.

In particular embodiments, the social-networking system 160 may be a network-addressable computing system that can host an online social network. The social-networking system 160 may generate, store, receive, and send social-networking data, such as, for example, user-profile data, concept-profile data, social-graph information, or other suitable data related to the online social network. The social-networking system 160 may be accessed by the other components of network environment 100 either directly or via a network 110. As an example and not by way of limitation, a client system 130 may access the social-networking system 160 using a web browser 132, or a native application associated with the social-networking system 160 (e.g., a mobile social-networking application, a messaging application, another suitable application, or any combination thereof) either directly or via a network 110. In particular embodiments, the social-networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, the social-networking system 160 may include one or more data stores 164. Data stores 164 may be used to store various types of information. In particular embodiments, the information stored in data stores 164 may be organized according to specific data structures. In particular embodiments, each data store 164 may be a relational, columnar, correlation, or other suitable database. Although this disclosure describes or illustrates particular types of databases, this disclosure contemplates any suitable types of databases. Particular embodiments may provide interfaces that enable a client system 130, a social-networking system 160, or a third-party system 170 to manage, retrieve, modify, add, or delete, the information stored in data store 164.

In particular embodiments, the social-networking system 160 may store one or more social graphs in one or more data stores 164. In particular embodiments, a social graph may include multiple nodes—which may include multiple user nodes (each corresponding to a particular user) or multiple concept nodes (each corresponding to a particular concept)—and multiple edges connecting the nodes. The social-networking system 160 may provide users of the online social network the ability to communicate and interact with other users. In particular embodiments, users may join the online social network via the social-networking system 160 and then add connections (e.g., relationships) to a number of other users of the social-networking system 160 whom they want to be connected to. Herein, the term "friend" may refer to any other user of the social-networking system 160 with whom a user has formed a connection, association, or relationship via the social-networking system 160.

In particular embodiments, the social-networking system 160 may provide users with the ability to take actions on various types of items or objects, supported by the social-networking system 160. As an example and not by way of limitation, the items and objects may include groups or social networks to which users of the social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in the social-networking system 160 or by an external system of a third-party system 170, which is separate from the social-networking system 160 and coupled to the social-networking system 160 via a network 110.

In particular embodiments, the social-networking system 160 may be capable of linking a variety of entities. As an example and not by way of limitation, the social-networking system 160 may enable users to interact with each other as well as receive content from third-party systems 170 or other entities, or to allow users to interact with these entities through an application programming interfaces (API) or other communication channels.

In particular embodiments, a third-party system 170 may include one or more types of servers, one or more data stores, one or more interfaces, including but not limited to APIs, one or more web services, one or more content sources, one or more networks, or any other suitable components, e.g., that servers may communicate with. A third-party system 170 may be operated by a different entity from an entity operating the social-networking system 160. In particular embodiments, however, the social-networking system 160 and third-party systems 170 may operate in conjunction with each other to provide social-networking services to users of the social-networking system 160 or third-party systems 170. In this sense, the social-networking system 160 may provide a platform, or backbone, which other systems, such as third-party systems 170, may use to provide social-networking services and functionality to users across the Internet.

In particular embodiments, a third-party system 170 may include a third-party content object provider. A third-party content object provider may include one or more sources of content objects, which may be communicated to a client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, the social-networking system 160 also includes user-generated content objects, which may enhance a user's interactions with the social-networking system 160. User-generated content may include anything a user can add, upload, send, or "post" to the social-networking system 160. As an example and not by way of limitation, a user communicates posts to the social-networking system 160 from a client system 130. Posts may include data such as status updates or other textual data, location information, photos, videos, links, music or other similar data or media. Content may also be added to the social-networking system 160 by a third-party through a "communication channel," such as a newsfeed or stream.

In particular embodiments, the social-networking system 160 may include a variety of servers, sub-systems, programs, modules, logs, and data stores. In particular embodiments, the social-networking system 160 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. The social-networking system 160 may also include suitable components such as network interfaces, security mechanisms, load balancers, failover servers, management-and-network-operations consoles, other suitable components, or any suitable combination thereof. In particular embodiments, the social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking the social-networking system 160 to one or more client systems 130 or one or more third-party systems 170 via a network 110. The web server may include a mail server or other messaging functionality for receiving and routing messages between the social-networking system 160 and one or more client systems 130. An API-request server may allow a third-party system 170 to access information from the social-networking system 160 by calling one or more APIs. An action logger may be used to receive communications from a web server about a user's actions on or off the social-networking system 160. In conjunction with the action log, a third-party-content-object log may be maintained of user exposures to third-party-content objects. A notification controller may provide information regarding content objects to a client system 130. Information may be pushed to a client system 130 as notifications, or information may be pulled from a client system 130 responsive to a request received from a client system 130. Authorization servers may be used to enforce one or more privacy settings of the users of the social-networking system 160. A privacy setting of a user determines how particular information associated with a user can be shared. The authorization server may allow users to opt in to or opt out of having their actions logged by the social-networking system 160 or shared with other systems (e.g., a third-party system 170), such as, for example, by setting appropriate privacy settings. Third-party-content-object stores may be used to store content objects received from third parties, such as a third-party system 170. Location stores may be used for storing location information received from client systems 130 associated with users. Advertisement-pricing modules may combine social information, the current time, location information, or other suitable information to provide relevant advertisements, in the form of notifications, to a user.

Figure 2:
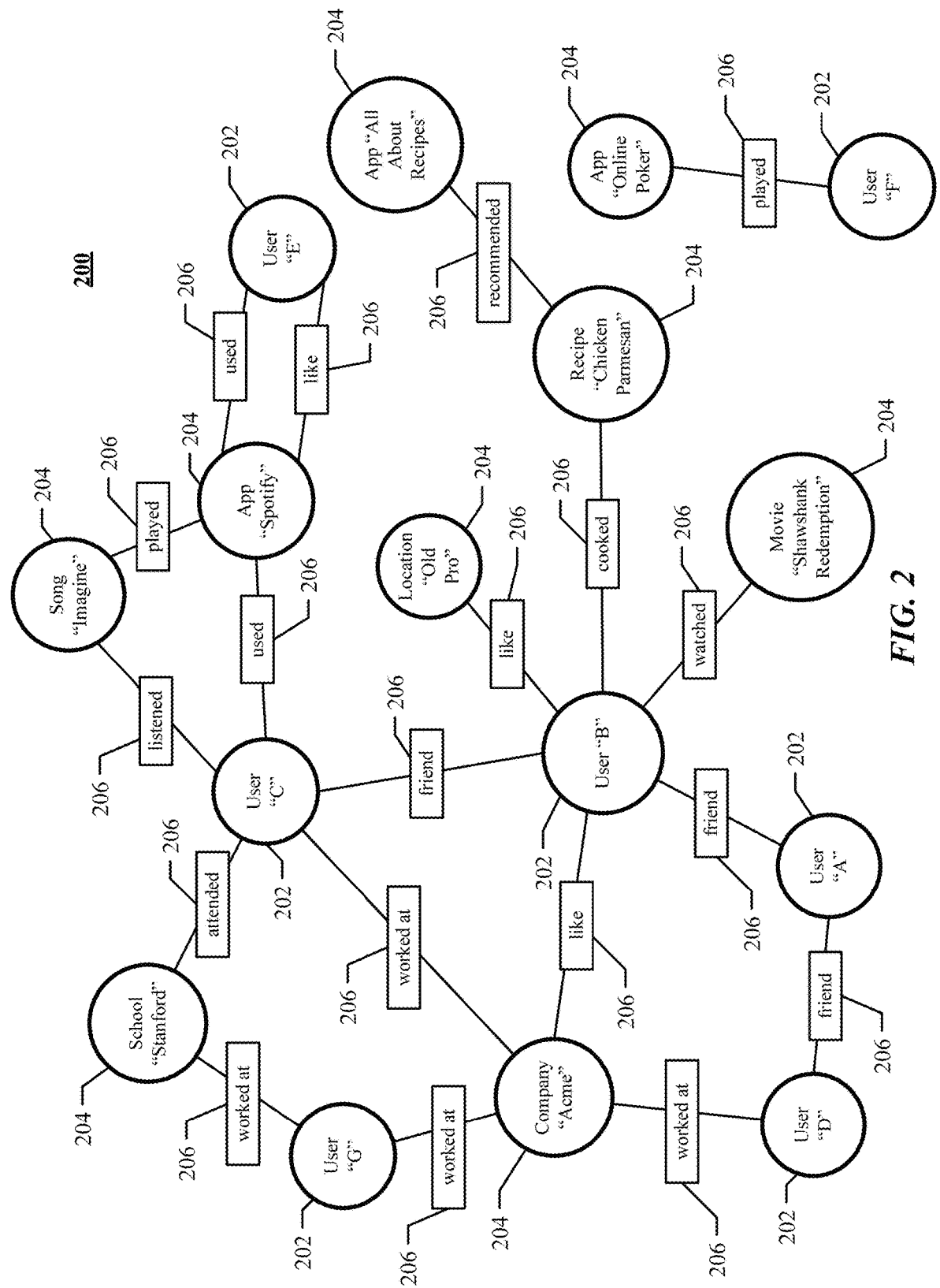
FIG. 2 illustrates an example social graph.

FIG. 2 illustrates an example social graph 200. In particular embodiments, the social-networking system 160 may store one or more social graphs 200 in one or more data stores. In particular embodiments, the social graph 200 may include multiple nodes—which may include multiple user nodes 202 or multiple concept nodes 204—and multiple edges 206 connecting the nodes. The example social graph 200 illustrated in FIG. 2 is shown, for didactic purposes, in a two-dimensional visual map representation. In particular embodiments, a social-networking system 160, a client system 130, or a third-party system 170 may access the social graph 200 and related social-graph information for suitable applications. The nodes and edges of the social graph 200 may be stored as data objects, for example, in a data store (such as a social-graph database). Such a data store may include one or more searchable or queryable indexes of nodes or edges of the social graph 200.

In particular embodiments, a user node 202 may correspond to a user of the social-networking system 160. As an example and not by way of limitation, a user may be an individual (human user), an entity (e.g., an enterprise, business, or third-party application), or a group (e.g., of individuals or entities) that interacts or communicates with or over the social-networking system 160. In particular embodiments, when a user registers for an account with the social-networking system 160, the social-networking system 160 may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with the social-networking system 160. In particular embodiments, a user node 202 may be associated with information provided by a user or information gathered by various systems, including the social-networking system 160. As an example and not by way of limitation, a user may provide his or her name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more webpages.

In particular embodiments, a concept node 204 may correspond to a concept. As an example and not by way of limitation, a concept may correspond to a place (such as, for example, a movie theater, restaurant, landmark, or city); a website (such as, for example, a website associated with the social-networking system 160 or a third-party website associated with a web-application server); an entity (such as, for example, a person, business, group, sports team, or celebrity); a resource (such as, for example, an audio file, video file, digital photo, text file, structured document, or application) which may be located within the social-networking system 160 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 204 may be associated with information of a concept provided by a user or information gathered by various systems, including the social-networking system 160. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 204 may be associated with one or more data objects corresponding to information associated with concept node 204. In particular embodiments, a concept node 204 may correspond to one or more webpages.

In particular embodiments, a node in the social graph 200 may represent or be represented by a webpage (which may be referred to as a "profile page"). Profile pages may be hosted by or accessible to the social-networking system 160. Profile pages may also be hosted on third-party websites associated with a third-party server 170. As an example and not by way of limitation, a profile page corresponding to a particular external webpage may be the particular external webpage and the profile page may correspond to a particular concept node 204. Profile pages may be viewable by all or a selected subset of other users. As an example and not by way of limitation, a user node 202 may have a corresponding user-profile page in which the corresponding user may add content, make declarations, or otherwise express himself or herself. As another example and not by way of limitation, a concept node 204 may have a corresponding concept-profile page in which one or more users may add content, make declarations, or express themselves, particularly in relation to the concept corresponding to concept node 204.

In particular embodiments, a concept node 204 may represent a third-party webpage or resource hosted by a third-party system 170. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check-in," "eat," "recommend," or another suitable action or activity. A user viewing the third-party webpage may perform an action by selecting one of the icons (e.g., "check-in"), causing a client system 130 to send to the social-networking system 160 a message indicating the user's action. In response to the message, the social-networking system 160 may create an edge (e.g., a check-in-type edge) between a user node 202 corresponding to the user and a concept node 204 corresponding to the third-party webpage or resource and store edge 206 in one or more data stores.

In particular embodiments, a pair of nodes in the social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, the social-networking system 160 may send a "friend request" to the second user. If the second user confirms the "friend request," the social-networking system 160 may create an edge 206 connecting the first user's user node 202 to the second user's user node 202 in the social graph 200 and store edge 206 as social-graph information in one or more of data stores 164. In the example of FIG. 2, the social graph 200 includes an edge 206 indicating a friend relation between user nodes 202 of user "A" and user "B" and an edge indicating a friend relation between user nodes 202 of user "C" and user "B." Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in the social graph 200 by one or more edges 206.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 2, a user may "like," "attended," "played," "listened," "cooked," "worked at," or "watched" a concept, each of which may correspond to an edge type or subtype. A concept-profile page corresponding to a concept node 204 may include, for example, a selectable "check in" icon (such as, for example, a clickable "check in" icon) or a selectable "add to favorites" icon. Similarly, after a user clicks these icons, the social-networking system 160 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, the social-networking system 160 may create a "listened" edge 206 and a "used" edge (as illustrated in FIG. 2) between user nodes 202 corresponding to the user and concept nodes 204 corresponding to the song and application to indicate that the user listened to the song and used the application. Moreover, the social-networking system 160 may create a "played" edge 206 (as illustrated in FIG. 2) between concept nodes 204 corresponding to the song and the application to indicate that the particular song was played by the particular application. In this case, "played" edge 206 corresponds to an action performed by an external application (SPOTIFY) on an external audio file (the song "Imagine"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has used at a particular concept. Alternatively, another edge 206 may represent each type of relationship (or multiples of a single relationship) between a user node 202 and a concept node 204 (as illustrated in FIG. 2 between user node 202 for user "E" and concept node 204 for "SPOTIFY").

In particular embodiments, the social-networking system 160 may create an edge 206 between a user node 202 and a concept node 204 in the social graph 200. As an example and not by way of limitation, a user viewing a concept-profile page (such as, for example, by using a web browser or a special-purpose application hosted by the user's client system 130) may indicate that he or she likes the concept represented by the concept node 204 by clicking or selecting a "Like" icon, which may cause the user's client system 130 to send to the social-networking system 160 a message indicating the user's liking of the concept associated with the concept-profile page. In response to the message, the social-networking system 160 may create an edge 206 between user node 202 associated with the user and concept node 204, as illustrated by "like" edge 206 between the user and concept node 204. In particular embodiments, the social-networking system 160 may store an edge 206 in one or more data stores. In particular embodiments, an edge 206 may be automatically formed by the social-networking system 160 in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

The popularity of e-commerce websites has fueled a rapid expansion of the number of products, services, experiences, and the like (collectively referred to herein for convenience as "products" or "items") offered for sale online. Low overhead costs and a wide array of available shipping options allow e-retailers to offer the same products that are sold in brick and mortar stores often for lower prices and with a larger selection of alternative items. Traditional brick and mortar franchises often list their products or items for sale online too, bringing their own market advantages to bear, such as by offering same day in-store pickup or delivery or lower prices provided by supply chain advantages of high-volume retailers. Today, nearly every product sold in the developed world is available online through numerous sellers. Often, services, products, and the like can be reviewed online via a review website. For example, a particular review website allows patients to review doctors that they've visited. Similarly, trips, experiences, goods, and services can be reviewed by other users, and these reviews can be shared online via review listings. As another example, a particular user can review his/her experience at a museum using a similar mechanism.

Usually, an item is made available for sale online via a "listing item" on a webpage. The listing item contains information regarding the item such as, for example, the seller of a product, the location of retail chains of the seller that may carry the product, a mechanism for a user to purchase the product over the internet (e.g., a "buy it now" or "add to cart" button), a mechanism to book a reservation at a restaurant or a hotel, and the like. In some cases, the same item may be listed on numerous (e.g., hundreds or thousands) of e-commerce websites via different listings that contain similar listing attributes. Often, these listings are not standardized across retailers. Some websites sell items with different available options, such as different sizes or colors, and may include purchase incentives, such as free shipping or other special features. As another example, a "suite" at a particular hotel may be offered with a king bed or two double beds. While both rooms are "suites" they each provide a different options or features. Similarly, reviews are hosted online in an item listing corresponding to a particular review or set of reviews However, this information is often difficult to aggregate between listings provided by various retailers.

While the particulars of listing item conventions vary between vendors, listing items are usually presented on content pages that share one or more identifiable or common attributes across vendors. For example, a typical e-commerce website may contain the following types of pages: item detail pages, non-item pages, multiple item listing pages (e.g., listing items by category or listing items responsive to a user search), and other generic web pages (e.g., home, about, blog articles, and the like). It may be useful to distinguish between each type of page in order to analyze the data contained therein. For example, when extracting information regarding item listings, item detail pages are useful because they present a large amount of relevant information regarding each item. As another example, item listing pages are useful for iterating through all items available on a particular webpage. The terms product listing, item listing, service listing, review listing, and any other type of identifiable listing are referenced interchangeably in the context of the present disclosure. For example, those of ordinary skill in the art will appreciate that the term product listing can refer to hotels, restaurant reservations, or other experiences. Similarly the same terminology may refer to review listings without departing from the scope of the present disclosure.

However, pages of an e-commerce website are often difficult to classify or identify since considerable processing of content pages is required to extract enough useful information to make a determination as to the type of page presented. For example, item detail pages are often laid out in a non-uniform layout as between different websites. Different websites may nest item listings within varying layers of nested HTML elements, such as multiple layers of "div" elements used in positioning item content and rendering other visual content items. Various other heterogeneous configurations for providing item listing information can be imagined. Accordingly, algorithms designed to extract item information from such listings should be adaptable to extract relevant information from any of a number of item listing formats. These algorithms may also be used to extract details regarding each item for clustering and normalization so that the extracted information can be used to improve user experience. For example, organizations often desire to use item information from different e-commerce sellers to benefit their customers. Sometimes a company providing a free service to a user, such as a social-networking service, may attempt to advertise particular items that correspond to identified interests of their users in order to continue providing that service free of charge. In some cases, this information can even be used to improve the provided service or to provide additional services to meet or surpass user expectations. The organization may receive resources from the e-commerce site in exchange for displaying an advertisement or contributing to a sale of the advertised item. This symbiotic relationship may allow the organization to pay for other resources, such as servers and employees, without charging its users. However, once item information has been extracted, an accurate and reliable mechanism for organizing that item information is required in order to productively use it.

In certain embodiments, a product listing aggregation service "crawls" content pages associated with e-commerce retailers to extract product information. "Crawling" may refer to iteration over and discovery of content pages. For example, a web crawler may crawl websites associated with a specific keyword. As another example, a crawler crawls a list of web domains. The crawler loads content associated with each identified page. In certain embodiments, content pages are classified based on identified attributes. The classifications can be used to formulate an algorithm tailored to crawling the particular site. For example, the algorithm may provide a smarter or more efficient means to iterate through each product listing, as opposed to other methods of product listing iteration such as, for example, brute force page iteration. Proper identification of product listing pages and product detail pages, as well as other pages, is critical to tailoring a crawling algorithm to a particular purpose.

In certain embodiments, e-commerce retailers are identified and content pages are crawled or processed to extract product listing information. For example, Big Corp., a fictional department store chain having numerous franchises (e.g., brick and mortar stores) throughout the country, lists products online through its website www.bigcorp.com in addition to selling products in its retail stores. Big Corp. lists products from various vendors in different departments or sections within its stores and on its website. The website contains a considerable amount of information regarding each listed products. The following product information is associated with each product listing: title, product reference number, manufacturer, color, size, model, product image(s), alternative product views, availability (e.g., units available in Big Corp.'s warehouse and/or at its franchise locations), price, description, special offers, product features, noun, manufacturer's product number (MPN), universal product code (UPC), dimensions, and the like. For example, a robust view of available product information is illustrated with reference to product panel 410 in product page 400 of FIG. 4. Notably, the structure of Big Corp.'s item listing website may differ dramatically from the structure of a competitor's item listing website. For example, Small Corp. may use completely different containers to host images of their items and may include far fewer and different product attributes via its website. Big Corp. may also release a product catalog in a human readable, machine readable, or any other format. For example, Big. Corp. distributes a structure document that lists each of its products, available options, and list price. The catalog contains some and/or all of the product listing information available on Big. Corp.'s website for each listed product.

In certain embodiments, an e-commerce company's website structure is analyzed to optimize product listing information retrieval operations. Website structure includes the layout of the site, organization of pages, architecture of the site, and the like. For example, Big Corp.'s website layout may be represented by a site map that provides a hierarchical mapping of content pages to other related content pages. A site map can be useful for navigating through pages of related content, such as product listing pages. In certain embodiments, a crawling process constructs a site map for a given set of web pages based on determined page types of particular pages. While analyzing the structure of a given web site, features of each content page are analyzed to identify elements, and the page is categorized as a particular "type" of page (e.g., product listing page, product detail page, home page, about page, and the like). For example, if a number of product listings are identified on a page, the page is classified as a product listing page.

In certain embodiments, a crawling process converts particular pages identified during a crawl into a hierarchical tree-based data structure that contains information regarding content elements associated with the page. The content elements are analyzed to identify product listings, reviews, and other identifiable product information. Identified elements are used to categorize pages. For example, www.bigcorp.com is structured so that product listings are accessible in multiple views. A home page of bigcorp.com may list several featured items in a feature products content panel. Additional pages of the bigcorp.com website showcase product listings using other content panels that are optimized for a particular purpose. For instance, the goal of the home page may be to draw in new users by showing users available products that they may be interested in or that they may not know are carried by the provider. Thus, the product listings on the home page may be optimized for that goal, such as by enlarging the picture, or by showcasing particular aspects of the product, instead of providing the most comprehensive view of the product (i.e., a complete listing of product information). Accordingly, while home pages are useful for attracting users, product listing algorithms or crawlers are better suited for examining other types of pages for product listing content. Thus, the product listing recognizer may categorize the home page as a non-product listing page (e.g., using any useful naming convention), and may move on to inspect additional pages, either by following links from featured products or using other interactive interface elements. In certain embodiments, webpage uniform resource locators (URL's) or identifiers (URI's) can be modified directly to retrieve additional relevant content pages. With reference to Small Corp. from the above example, the analysis process may be similar but yield different results for each website. For example, since the structure of the Small Corp. website is dramatically different than the structure of Big Corp.'s site the process adapts to the different structure of each website to extract the proper or desired information. For example, if item listings are in a left side column on Big Corp.'s website and in a right side column on Small Corp.'s website, the process described herein is applied from the top level of the structured document down to ensure that the proper elements are found on each site, despite the sites having heterogeneous structures.

As another example, the crawling algorithm retrieves another content page associated with Big Corp. This page contains information regarding various product listings. For example, with reference to FIG. 5, an example web page 500 associated with Big Corp. is illustrated in accordance with a non-limiting embodiment of the present disclosure. Web page 500 displays a content panel 510 containing a row of product listings 512A-D and navigation panel 520. Each product listing 512A-D is represented by an image, a model name, a manufacturer, brief description, price, and color options. In this example, each product listing provides a high level overview of a men's jacket product. In certain embodiments, a web crawling process receives, for example, html instructions for building this webpage. A DOM is constructed to analyze page elements. In certain embodiments, the crawling process is provided with a more generalized URL that is manipulated to retrieve the listing of men's jackets shown in FIG. 5.

Figure 5:
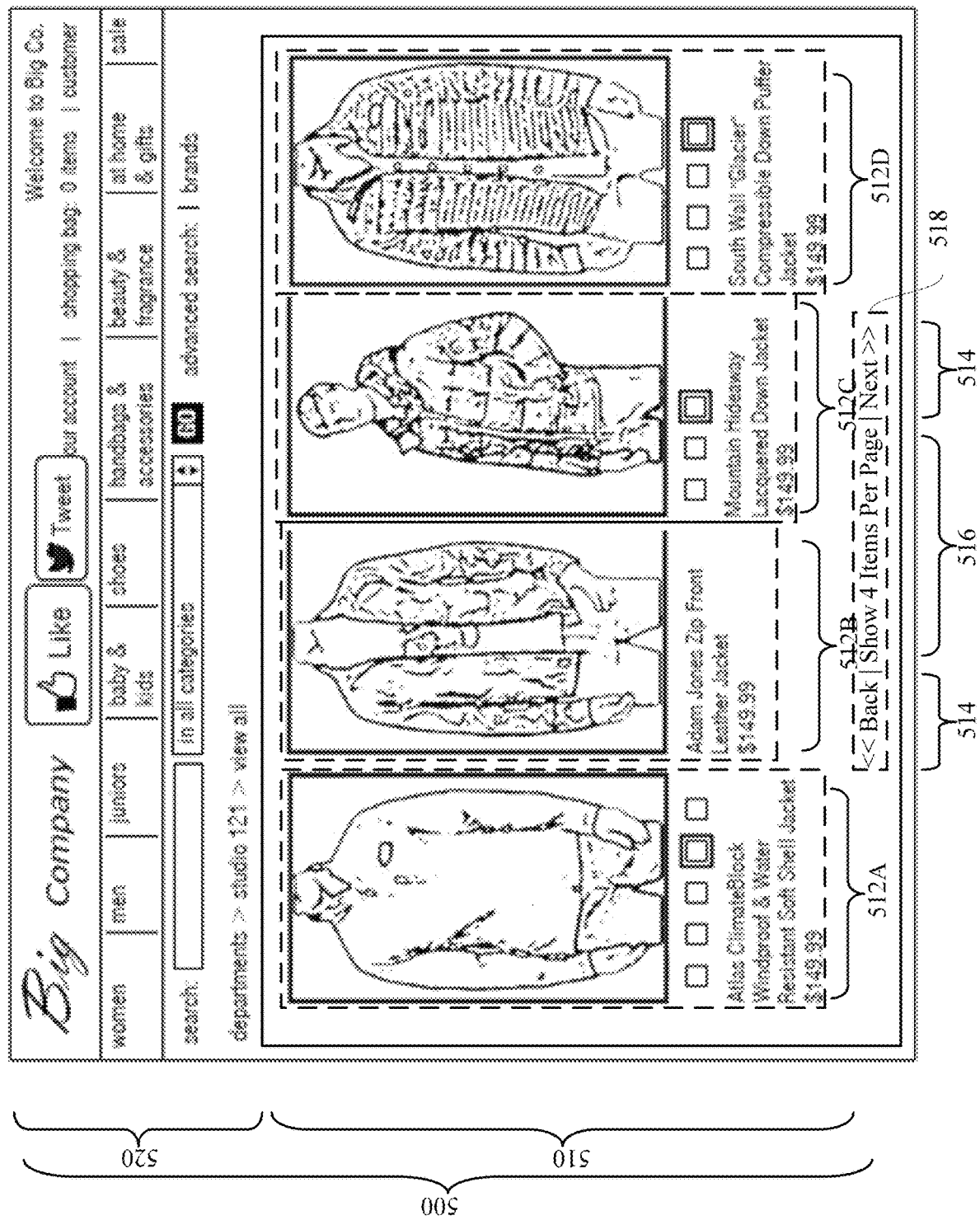
FIG. 5 illustrates an example product listing page featuring product listings.
Figure 6:
FIG. 6 illustrates an example webpage that is not associated with any product listings.

With reference to content panel 510 shown in FIG. 5, four product listings 512A-D are listed in a first row. In certain embodiments, page 500 includes additional rows of product listings. The additional listings may be related to the other product listings. Page 500 also includes navigation button links 514 (i.e., "Back" and/or "Next" buttons or links), and a combo box 516 for selecting the number of items listed on each page. Presently, only 4 products are listed on each page; however, combo box 516 may have interactive functionality that allows an end user to select the desired number of product listings to display per page. By way of explanation, client devices connected via low bandwidth connections may load pages with less content faster than pages with large amounts of content. On certain pages, a left side column contains product attributes used for filtering product listings. With reference to webpage 500, a breadcrumb trail in navigation panel 520 shows product attribute tags leading to the current listing of products. Certain web pages may have a product attribute filtering section that allows users to select particular product attributes for narrowing and/or expanding the list of displayed products.

In certain embodiments, a product listing recognition process identifies each of these elements to assess whether the current page is a product listing page or some other type of page. In this example, the process generates a DOM representation of the webpage and identifies candidate nodes that are potentially associated with product listings. For example, each image in 512A-D in the above described page is flagged as a candidate node. The DOM structure is traversed (e.g., up and/or down the hierarchy from each flagged candidate node) and the context of each node is analyzed. The candidate flag is confirmed or denied based on additional information gathered during the DOM traversal process that tends to include or exclude the candidate node as a product listing. The page is flagged as a product listing page based on whether the identified attributes are similar to a set of defined characteristics that define a product listing page. In certain embodiments, the characteristics include identifying more than one product listing, navigation button, listing the criteria, and the like. In certain embodiments, other page types are classified based on whether page attributes are similar to a set of defined characteristics that define any type of page, such as an item details page, an about page, a home page, and the like.

In certain embodiments, information extraction is optimized based on the type of page. For example, as described above, a product listing recognizer is used to crawl pages, identify item listings, and classify pages based on defined page type characteristics. An information extraction process that is optimized for extracting information from each type of page is selected based on the current page type. For example, the information extraction process selected for extracting item listing information from an item listing page is different from the information extraction process selected for extracting information from an item details page. The former may be more adept at retrieving information for a large number of different items, while the latter is optimized to extract item listings information regarding related items.

With reference to FIG. 5, markup language text (e.g., HTML) representing webpage 500 is processed to generate an object model. Each element, such as product panels 512A-D, Next and Back buttons 514, combo box 516, product images, item descriptions, color selections, and each other element represented on page 500 is processed to create a hierarchical tree-based data structure. Each element is represented in the data structure as an object and each attribute of the element is represented as an attribute of that object. For example, content panel 510 contains sub-elements of product listings 512A-D. Each product listing 512A-D is hosted in its own panel (e.g., denoted by a "<DIV>" tag) that is represented in the data structure, and each sub-element of product listing 512A-D (e.g., image, description, title, model, color, etc.) is also represented in the data structure. Attributes of each element are represented as object or node attributes in the data structure. For example, the size and position of the content panel for each product listing 512A-D is specified as attributes in the data structure. In certain embodiments, the data structure is relational. For example, the data structure includes a hierarchy of object elements. Each element may have sub-elements. A root page element contains all other content within page 500.

Figure 3:
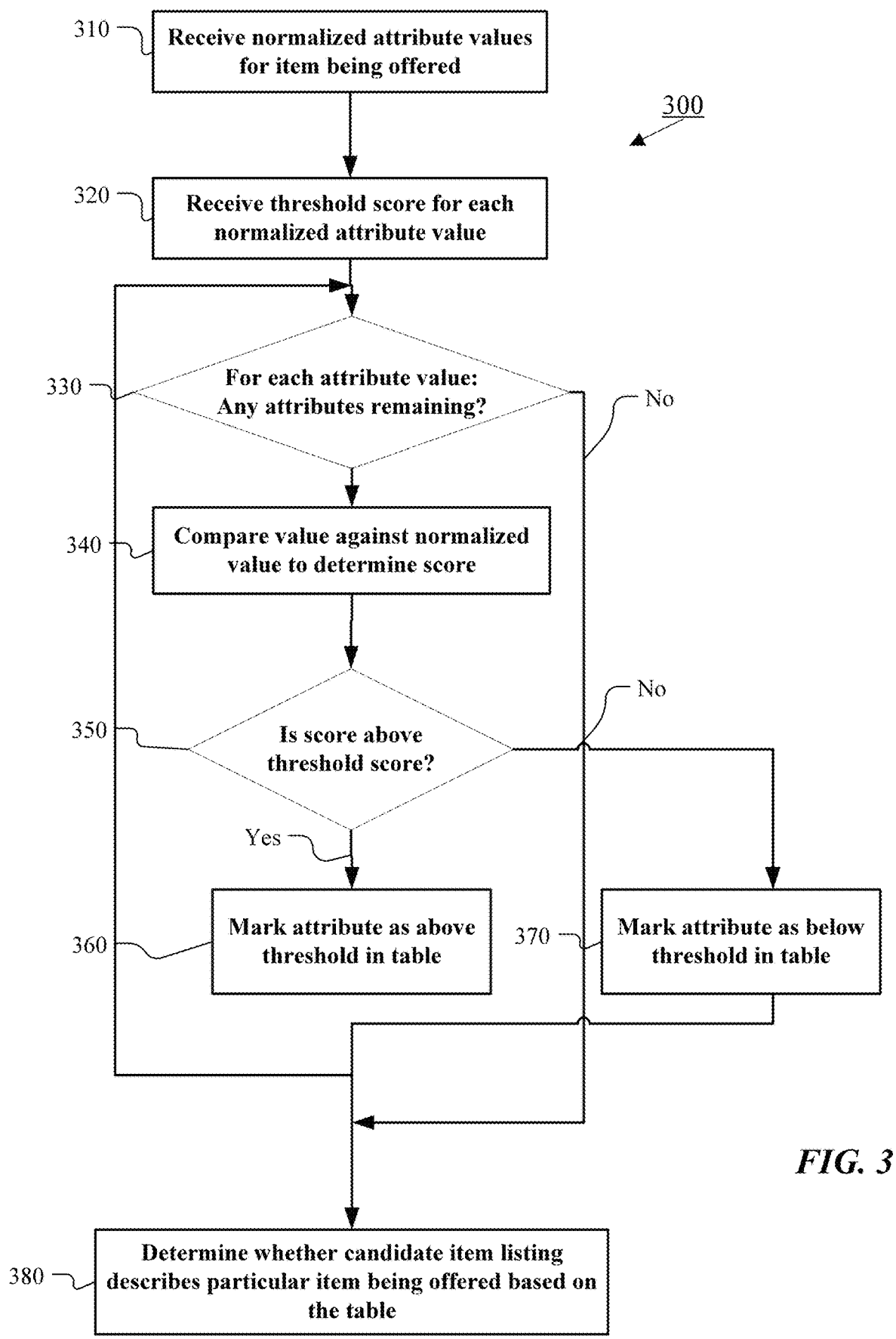
FIG. 3 illustrates an example flow chart of a method for recognizing product listings.

With reference to FIG. 3, a process 300 for organizing item listing data retrieved from various content pages is illustrated in accordance with a non-limiting embodiment of the present disclosure. For example, once the crawling algorithms described above retrieve data, one or more reliable methods of organizing the data are needed for efficient use of the data. Once the data is organized, it can be used in various applications. For example, a user affinity with a particular item can be assessed, and related items can be displayed to that user. Such uses may present avenues for marketing, advertising, and promoting user interaction with applications such as web applications or social-networking systems.

At step 310, normalized attribute values are received. For example, a clustering process can extract frequently occurring attribute values for an item being "offered." Items being offered include products, services, hotels, travel, experiences, shows, and the like. The crawling process described above identifies item listing pages and extracts item information from those pages. A set of normalized attribute values is determined with reference to the various methods described for determining normalized attribute values. For example, the following sections describe several example methods for extracting sets of normalized attribute values.

Certain product clustering algorithms use a set of sample product offers having a common schema to determine a set of normalized attribute values for a particular product. For example, one product clustering algorithm analyzes a data set of thousands, millions, or more product offers to identify distinct products being offered for sale and determines normalized attribute values for each distinct product. This process may be referred to as product attribute "disambiguation." The normalized attribute values may serve as a set of rules for defining when a particular product offer should be associated with the product. Once the rules are established, the entire set of product offers can be scored against the normalized attributes. The rules are used to determine whether the scores evince a likelihood that the product offer is associated with the product. The process of using normalized attributes and rules to associate candidate product offers with a particular product may be referred to as "product clustering." Once a set of products are "clustered," or associated with the particular product, the individual product offer information can be presented to users in various practical applications. For example, product offer information can be used to suggest a product offer to a user based on interactions with a website that describe a particular user's interests or tastes. As another example, product offer information can be used in conjunction with user interest information to display relevant and effective advertisements.

In certain embodiments, a particular product being offered for sale is identified. For example, an administrator may manually identify a product. As another example, distinct products being offered for sale are identified by creating "seed" product offers. "Seed" product offers can refer to product offer information that contains a most "complete" set of attributes. For example, the seed product can be determined by a process that scans attribute values of each product offer to determine a most "complete" set of attribute values. The term "complete" set of attribute values may refer to a product offer that has attribute value entries for a greatest number of attributes. A complete set of attributes may also refer to a product offer that has values provided for certain key attributes. The completeness of the attribute data may be an indication of the quality of the product offer for the purposes of determining normalized attributes or grouping additional offers.

For example, universal product code ("UPC") attribute values may be rare since this information is typically not user-friendly or conducive to a traditional user purchasing a product. Accordingly, UPC's are traditionally not provided on product pages and thus are not usually recoverable by product information extraction processes. Accordingly, a "complete" set of attributes may include a UPC entry. Other factors and considerations can be applied when determining a complete set of attributes for purposes of identifying a seed product offer. Seed product offers can often be relied on to identify distinct products or product offers because they do not overlap with other product offers or products. Using the above example and with reference to the UPC attribute, while it is rare to find UPC data for product offers, it is also unlikely or impossible for two different products to have the same UPC attribute value. Accordingly, while this value is unlikely to be useful for grouping large numbers of product offers together, it may be useful for identifying distinct products. Once the distinct products are identified, similarities between other attribute values can be used to accurately group or cluster large numbers of products together. This logic also applies to other attribute values, such as MPN, model, etc.

In certain embodiments, distinct products can be identified with reference to a particular e-commerce website. In this example, a trusted website is crawled to determine discrete product listings. The trusted web-site, for example, may be known to provide comprehensive information regarding camera products. The web-site may list each distinct type of camera available on the market. The trusted website may be determined with reference to total traffic to the site, total number of products available on the site, or any other measure of confidence in the site. However, while the site may be relied on for discovering distinct products, such as cameras having similar model numbers but different functional capabilities, the trusted site does not provide the most complete set of attributes for each product or the attributes that best describe the majority of product offers for the product. Accordingly, normalized product attributes are determined with reference to a much larger data set of product offers.

In certain embodiments, queries are executed through a specialized search engine that normalizes query attributes for execution on product offer databases. The search engine queries one or more databases to return the best top-K candidates that are similar to the requested product, while eliminating products with similar names that are not similar to the requested product. In certain embodiments, the search engine uses information from particular query attributes to generate a modified query that, when executed, is better tuned to retrieve responsive products. For example, a first retailer may have named a product "Picture SD-100 camera," while a second retailer names the same product "Picture sd 100 digitalcamera." If a classic relational database query is used, it is unlikely that both entries would be retrieved using a traditional database query. For example, the query for "picture" (which is the only word that is common in both of these product titles) would be far too broad and return many non-responsive products. Thus, a query designed to identify the largest common character set between products is problematic. A specialized search engine can be used to normalize such queries. For example, the word "digital-camera" is very similar to the word "camera." The search engine analyzes common terms between product listings to determine effective search strings and identify queries for those products within the search strings or queries. As another example, "sd 100" is very similar to "SD-100" and is a fairly unique identifier (though product identifiers or model numbers are rarely guaranteed to be unique). Accordingly, by normalizing both of these query terms (i.e., digital-camera and SD-100) a more effective search can be executed on one or more underlying repositories of product or product offer information.

The search engine is also effective at narrowing the scope of returned products and product offers. Queries on traditional databases have a tendency to return many accessories or products that are only tangentially related to the underlying targeted product. For example, if a query includes the phrase "picture sd100 camera," it will not only return cameras, but will also return many results including batteries, cases, lenses, etc. However, none of these products are directly related to the underlying query, and thus should be eliminated from any result set of candidates. For example, inclusion of many unrelated products may result in an unreliable cluster rule. In certain embodiments, certain search query attributes may indicate that inclusion of such items is intended and/or desirable. For example, if the purposes of a query is to identify accessories for a particular product, then these results would be useful. The search engine can also be used to extract context data from the search query to determine whether or not accessories or related items should be included. The search query normalization may be modified according to any appropriate determination.

In certain embodiments, product clustering helps improve search experience, for example, by supporting price comparison to identify product offer deals or values for customers. In certain embodiments, the relevance ranking of products is improved. For example, if multiple retailers are selling the same camera, it should be ranked higher for the generic query "digital camera" than other cameras that are not as popular or as readily available. Clustering may additionally improve result diversity in search results. For example, duplicate product offers from multiple stores can be eliminated in favor of showing just the best value for each responsive product.

In certain embodiments, product clustering and associated algorithms can aggregate product reviews and likes across retailers. For example, each discrete camera can have multiple reviews imported from each retailer site that sells that product. This allows consumers to be more informed about each product before making his/her purchase. In certain embodiments, clustering allows for the mining of product information from a wide array of different retailer's information regarding that product. For example, if one retailer says that a certain batter is associated with a particular camera, that battery can be recommended for use with a product offer for that camera from a different retailer. Clustering products together allows aggregation of this information.

The teachings of the present disclosure can use these normalized attribute values to continuously prune "clusters" and add new item listings to clusters. Clusters may refer to groupings of item listing information. For example, a particular hat is being sold on numerous websites. The hat can be described in various manners, but the underlying description is referencing the same product. These heterogeneous item listing descriptions can be aggregated and grouped into a "cluster" of item listing descriptions. Normalized attribute values can be determined with reference to item listings in the clusters so that other associated item listings can also be grouped in the cluster. These normalized attribute values are received at step 310.

Figure 4:
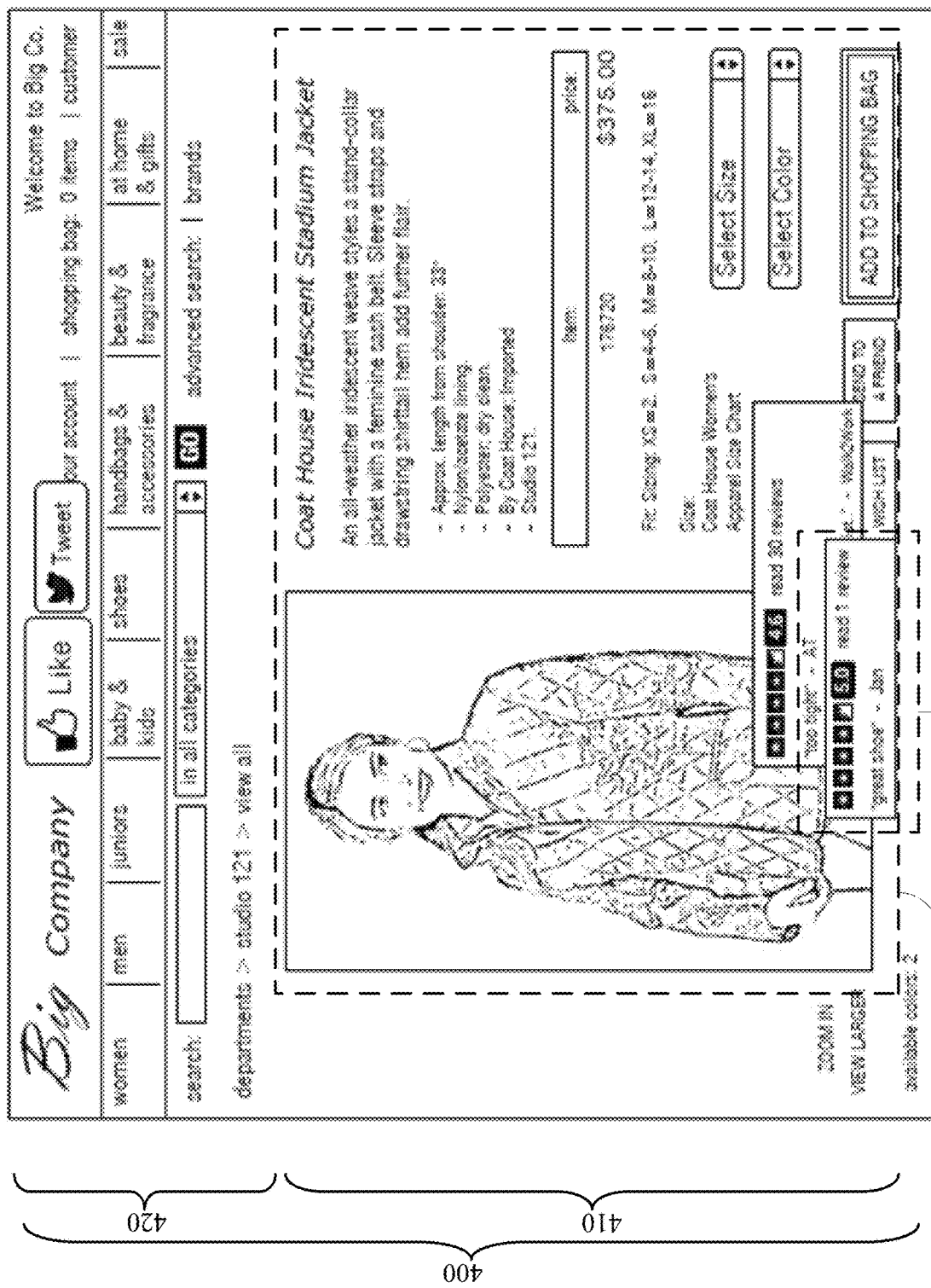
FIG. 4 illustrates an example product details page.
Figure 8:
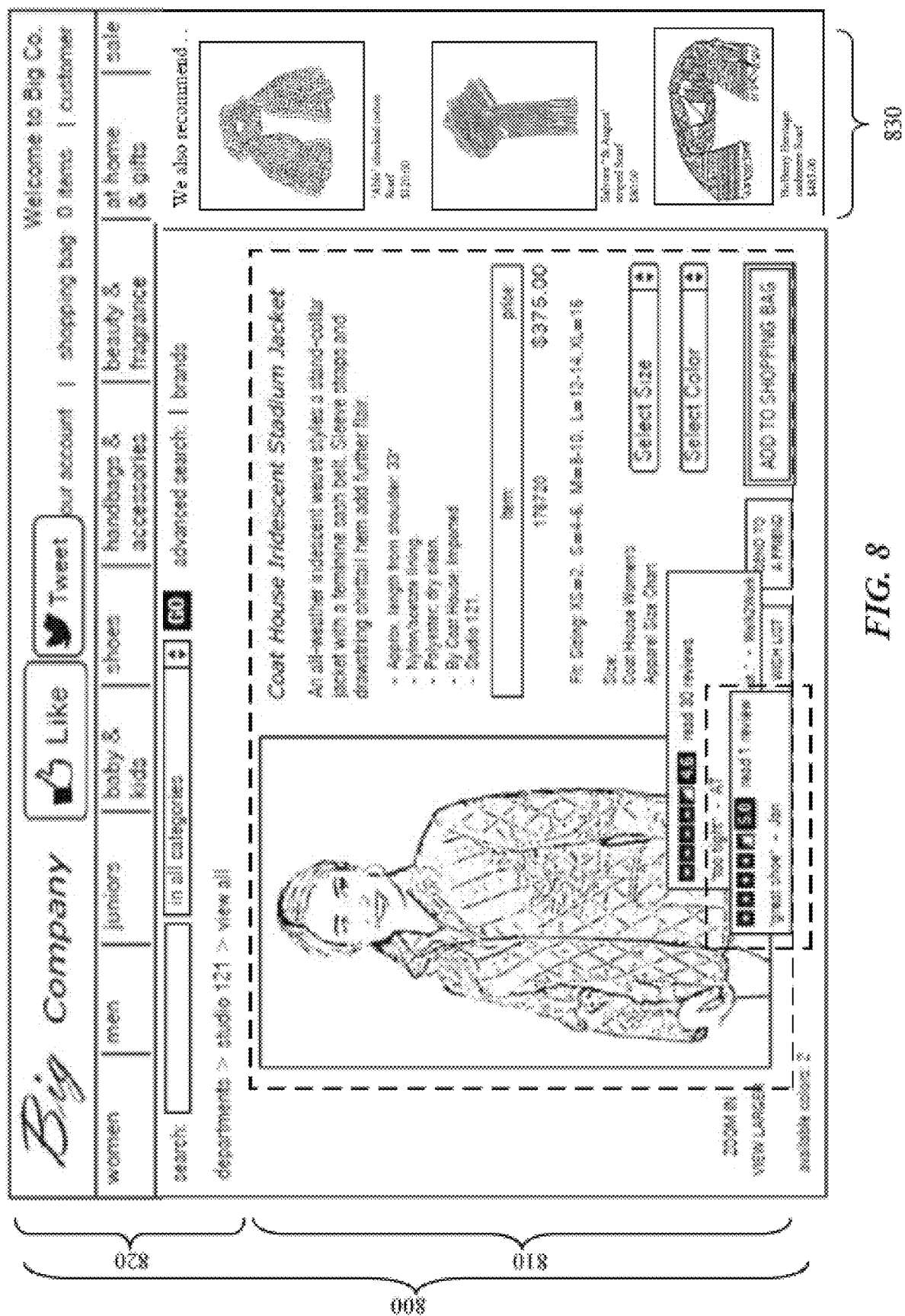
FIG. 8 illustrates an example product page with related item listings.

For example, normalized attribute values for the women's coat depicted in FIG. 4 are also received. Item listing information from the women's coat item listing depicted in FIG. 8 are treated as candidate item listing information and are compared, with reference to later steps of process 300, to the set of normalized attribute values that correspond to women's coat in FIG. 4. The normalized attribute values for women's coat depicted in FIG. 4 are aggregated from a set of item listings that have been confirmed as being associated with that coat.

At step 320, a threshold score for each normalized attribute value is received. For example, a system determines a threshold score for each attribute value. The threshold score dictates the relative level of "matching" required between the candidate list item attribute values and the normalized attribute values. For example, a matching algorithm is applied between a candidate list item attribute value and the normalized attribute value to produce a score. The threshold score dictates some minimum score that must be received for that attribute to be said to "match" the normalized attribute value. For example, the normalized attribute values correspond to the women's coat depicted in FIG. 4. In this example, the normalized attribute values may be as follows:
Title: "Coat House Iridescent Stadium Jacket"
Model: "Iridescent Stadium Jacket"
Brand: "Coat House"
Description: "An all-weather iridescent weave styles a stand-collar . . . ."

At step 330, each attribute value of a candidate item is iterated through. For example, information representing a new item listing is extracted from a web page and received by process 300. In certain embodiments, certain attribute about the item listing indicate that the item listing is likely associated with the underlying item being offered. In this instance, the normalized attribute values are representative of the underlying item being offered. In certain embodiments, item listings that are already associated with the cluster for the underlying item being offered are re-screened to ensure that all clustered items match updated normalized attribute values. This iterative process ensures that the most up-to-date item listing catalogs are kept. If any attribute values remain in the candidate item, process 300 proceeds to step 340. If no attribute values remain then the process jumps down to step 380.

For example, with reference to the candidate item listing depicted in FIG. 8, the attribute values iterated through may include: Title, Model, Brand, and Description. In this example, a crawling process crawls unstructured markup associated with content page 800 to extract the following attribute values:
Title: "Coat House Iridescent Stadium Jacket"
Model: "Iridescent Stadium Jacket"
Brand: "Coat House"
Description: "An all-weather iridescent weave styles a stand-collar . . . ."

Each of these attribute values for this candidate item listing is iterated through at step 330 to determine whether the candidate item listing is associated with the item listing in FIG. 4.

At step 340, the selected attribute value is compared against normalized values to determine a score. For example, a match algorithm is used to assign weights or scores that indicate the degree of similarity between two attribute values. For example, the plural form of a particular item model may present a high degree of similarity, while not being a full match. Such a match may be provided a score such as 0.95. A full match on the other hand may be given a score of 1. Various other scoring and weighting systems are contemplated within the scope of the present disclosure.

In certain embodiments, the attribute value matching takes values that are closely related but not exact matches into consideration. These near-matches may be considered matches, or included in the cumulative tally for the value as a fraction of a point. In the brand example described above, the value "Coat House" is similar to the value "CoatHouse." In certain embodiments, the matches for "CoatHouse" can be scored as full matches for "Coat House," while in other embodiments, only full or partial credit for a match is given to the "CoatHouse" values. Using the above example, if a full match point is given for near-matches, the "Coat House" value may receive a score of 297 (270 for Coat House+27 for CoatHouse). If partial match points are given for near-matches, the "Coat House" value may receive a score of 283.5 (270 for Coat House+13.5 for CoatHouse). Any scoring system may be applied that assigns full or partial weight for hard or soft matches.

At step 370, each attribute value of each candidate offer is scored. In certain embodiments, the attribute values are scored based whether they match the common attribute values and counts for those values as described in step 360. For example, an attribute value that exactly matches the most commonly occurring attribute value receives a score of 1. An attribute value that exactly matches the second most commonly occurring attribute value receives a score of 0.5 (one-half point). Using the above example, a candidate offer having a brand attribute value of "Coat House" receives a score of 1, since "Coat House" is the most commonly occurring brand in the set (i.e., appears in the candidate set 270/300 candidates). A candidate offer having a brand attribute value of "Jacket House" (who for purposes of this example may be considered a competitor of the Coat House brand), may receive a score of 0 for that attribute value. A candidate offer having a brand attribute value of "Coat-House" may receive a score of 0.5. In certain embodiments, score points are only awarded for a match with the most commonly occurring attribute values. Using the above example, the "CoatHouse" attribute value may receive a score of 0.

In certain embodiments, the scores are weighted based on the quality of the match. In other words, attribute values that do not exactly match the common values are still awarded scores. For example, partial or full match scores can be assigned for partial matches, misspellings, errors, abbreviations, acronyms, and the like. For example, a "vacuum cleaner" may be abbreviated as a "vac" or "vacuum." Such abbreviations may be considered equal to a full match of the "vacuum cleaner" attribute and may be awarded a score as if the term was a hard match. In certain embodiments, partial or no score credit is given for abbreviations.

Certain attributes are structured to contain a set of values. For example, a "noun" feature includes any and/or all values from the set of product nouns. The noun feature may include the values "digital camera" and "camera" as product noun values. As another example, a vacuum may have several product nouns including "vac," "vacuum," and "vacuum cleaner." Comparison of these values becomes more complex, since many possible comparison combinations are possible. Other issues arise such as how to score attribute values for complex attributes with some matching components and other components that do not match. In certain embodiments, complex attribute scoring is achieved through a scoring algorithm that matches each common attribute value component (the common product may also have complex attributes) against each candidate noun value. For example, each component of the noun attribute described above of the most commonly occurring noun is matched against each component of the noun attribute of each candidate offer. A cumulative score for the attribute is generated by considering each match score.

The attribute scores are determined by multiplying the common attribute value score by the match score. For example, a candidate brand attribute value of "CoatHouse" receives a match score of 0.5*270=135 (i.e., 0.5 match score*270 times that "Coat House" was found in the brand attribute of the candidate offers).

In certain embodiments, different attribute values are used in the comparison in order to catch errors in the product information extraction processes. For example, some websites may list a product's brand in the same text region as the product's title or model. Such a configuration may be confusing to an information extraction process tasked with extracting attribute values from non-standardized web pages. Accordingly, since candidate offers are assembled with information from such an information extraction process, it is likely that attribute values may wind up in the wrong attribute. By way of example, with reference to FIG. 4, product details panel 412 has a product title/model text region that contains the brand "Coat House" with the product title "Iridescent Stadium Jacket." In this example, these two distinct attributes may be hosted in the same content panel or text element. Parsing the brand from the product title may be difficult or impossible for an automated system to accomplish. As a result, brand information is pulled into the product title or model number attribute. The opposite is equally possible. In order to catch errors in mapping attributes from a product details page to a candidate offer, several seed offer attribute values may be compared against the candidate's attribute values. For example, when scoring the brand attribute for a particular candidate offer representative of the product shown in panel 412 of FIG. 4, both the brand and product attribute values from the seed product may be compared against the brand and/or product attribute values of the candidate offer. In certain embodiments, matches between a candidate offer brand attribute value and a seed offer product model attribute may be given a near-full match score, since the misplaced attribute value is likely due to an error during information extraction of either the brand and/or product model attributes of either the seed offer or the candidate offer. For example, the score assigned in this instance may be 0.96.

For example, the following table can be used to set match scores. This example is illustrative of the scoring rules for a "noun" attribute but is also exemplary of other attribute scoring rules:

| Match type: | Match Score: |
|---|---|
| Exact | 1.0 |
| Match all title | 0.96 |
| Match contextual | 0.96 |
| Match all | 0.81 |
| Match last | 0.3 |

Referring to the scoring system described above, an exact attribute match (e.g., candidate offer noun value to common attribute noun value) is given a score of 1.0. A match of the candidate offer noun attribute to a common attribute title value is given a score of 0.96. Other attribute values can be used for the "match contextual" match. For example, if the candidate offer noun value matches one or more common attribute values, the match is given a score of 0.96.

As another example, consider a matching algorithm applied for the brand attribute. If the candidate brand attribute value is equal to the common brand value then the match is given a score of 1. If the candidate brand attribute value contains the common brand value after, for example, the words "for" and/or "with" (as in the phrase "for use with Coat House Jackets") then the match is given a score of 0. If the candidate product attribute value matches the common product attribute value but the candidate brand attribute value is different than the common product brand attribute value then the match is given a score of 0.65. If the candidate offer product title contains the common product brand value then the match is given a score of 0.85. Those of ordinary skill in the art will appreciate the wide variety of matching algorithms that may be applied for each attribute.

At steps 350-370 a determination is made as to whether the scores are above a threshold score, and the determination is preserved. For example, the comparison can be preserved in a table, such as the one depicted in FIG. 7. Row 702—n illustrates an example table of all clustered product comparisons. The "IsMember" column determines if the candidate item listing should be grouped in the cluster or not. Such a determination may be made with reference to a set of rules. In certain embodiments, the table lists every possible outcome and denotes whether a candidate item listing should be clustered in the group on a case by case basis. With reference to FIG. 7, the "L" and "H" values denote whether the candidate item listing matching score for that particular attribute value is above or below a low threshold score, or above or below a high threshold score. For example, in line n, the "Anum" attribute has an "LH" value which denotes that the corresponding candidate listing item score is between the high and low threshold score. With reference to the "IsMember" column of row n, a candidate listing item with the attribute matching values shown in row n would be considered a member of the cluster.

At step 380, a determination is made as to whether the candidate item listing describes the particular item being offered based on the table. For example, with reference to FIG. 7, the table's "IsMember" column can dictate whether candidate item listings corresponding to the attribute value matching profile shown in each row is to be considered a member of the cluster. In certain embodiments, the "IsMember" determination is made with reference to a set of rules. For example, the rules can dictate a specific number of attributes whose scores must match above the threshold level (or in the case of FIG. 7, levels). In certain embodiments, the rules specify weights for each attribute. For example, high matching scores for certain attributes may indicate a higher probability that the candidate listing item is indeed associated with the underlying item being offered.

In certain embodiments, an algorithm can be trained for a particular web site based on product listings on that site. This may occur in a generalization step. This includes determining criteria for quickly determining pivot, parent, and child items, as well as criteria for filtering irrelevant pivot items. For example, the algorithm may be run on a variety of e-commerce websites. However, the algorithm can be trained for each particular website in a different manner, such as in order to locate particular pivot items or product groupings. The extracted product listings are then added to a structure or model that includes information regarding listings on numerous web sites. Updates to each product listing can be periodically gathered and pushed to the structure. The structure can be used in a search engine to locate relevant products as described below.

In certain embodiments, product review information is also extracted from a product listing page and included in the structure to provide more information regarding each particular product. For example, dates may be selected as pivot items, since they are commonly associated with reviews. A content element that includes rating information or some other special keywords can be used to verify parent and child nodes after locating pivot items in the HTML page. For example, a product listing has 5 reviews presented below it. This review information can be retrieved and stored with the product listing in the search structure. As another example, the search structure may be classified, and reviews can be associated with a product listing classification, such as a particular jacket by a particular manufacturer.

In certain embodiments, a "domain model" is generated that describes each listing item extracted from the content page. For example, the process extracts several listing items from page 400, including listing items 412 corresponding to a product listing and listing item 414 corresponding to a product review. The domain model describes the broad category of listing items at an abstract level so that a determination can be made as to what type of listing item the identified item is as well as what type of page the content page is. In certain embodiments, the domain model includes a filterable list of attributes that describe the structure and properties or attributes of corresponding DOM nodes or objects that are associated with each underlying listing item. The domain model can also be filterable based on the page type. For example, within the "shopping" or "product listing" domain, "price" may be an attribute that can be used to filter identified listing items on the page. Using the example of page 400 in FIG. 4, listing item 412 has a price attribute but listing items 414 do not. In this example, this may indicate that listing item 412 is a product listing while listing items 414 are review listings. As another example, in the "review" domain, "rating" may be an attribute that can be used to filter detected items on the page. Continuing on the with above example, listing item 412 may have not "rating" attribute, while listing items 414 each have a "rating" attribute. The presence of a "rating" attribute can be a strong indicator that the listing items 414 are review items.

Figure 9:
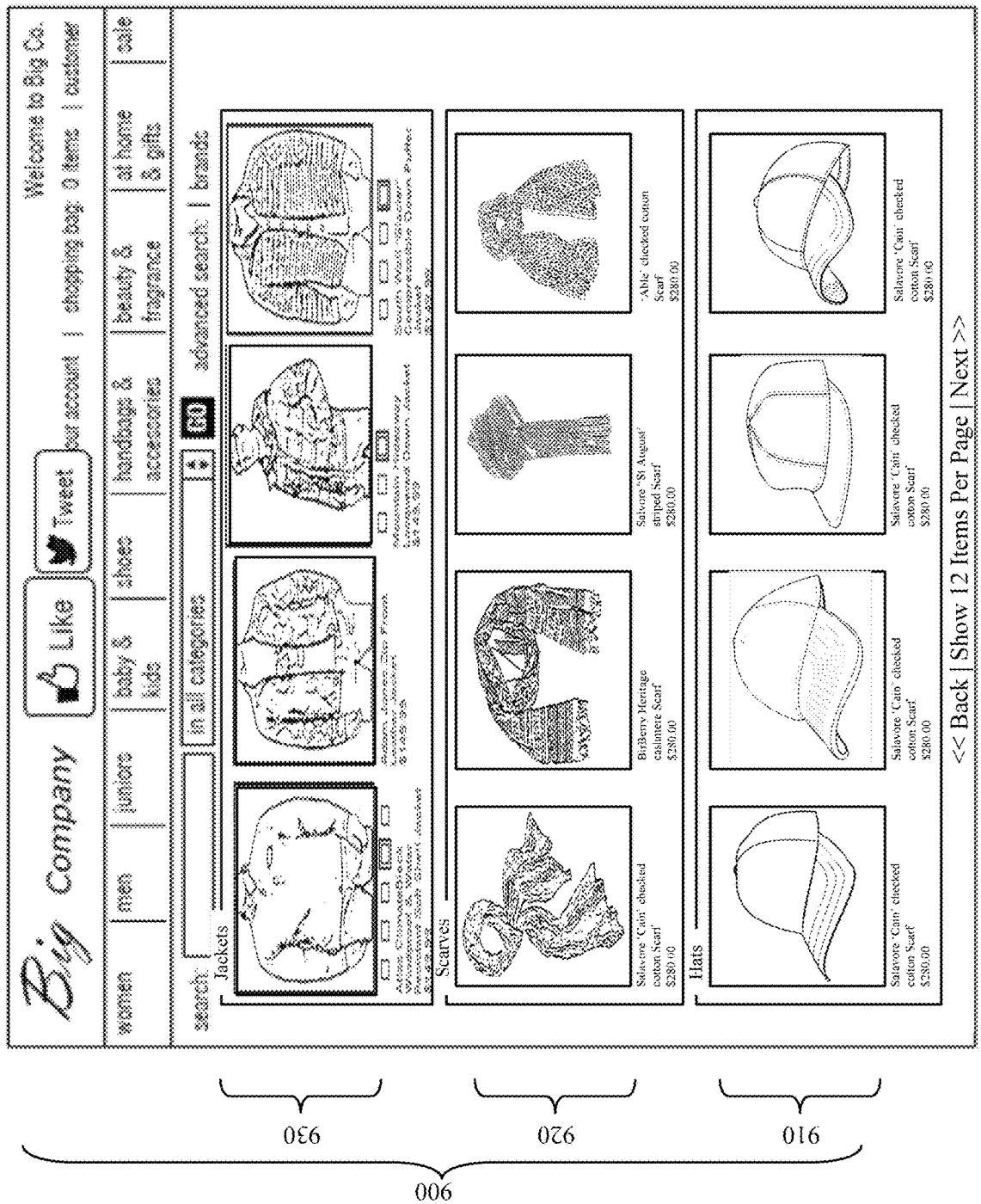
FIG. 9 illustrates an example product listing page displaying various product listing categories.

In certain embodiments, extracted information from item listing pages can be used to provide recommendations to users. For example, if a particular item appears in a "related items" section of an item details or an item listing page, the item may be recommended to the user via a different platform. For example, a social-networking system may provide recommendations to users based on items that users are interested in and related items that are related to those items as identified on other item pages associated with the item that the user is interested in. For example, a user "likes" a particular product via a social-networking page for that product. The information extraction and item crawling processes described herein may identify products that are related to that product on web pages that the user may have never visited. For example, with reference to FIG. 8, section 830 contains a column of recommended items that are related to the primary product identified on the page in section 810. These related products can be provided for display to the user in a recommendations section based on the user's association with (i.e., "liking" or becoming a "fan" of) the underlying product. With reference to FIG. 9, rows of product listings for products associated with different groupings are illustrated. For example, row 910 lists scarves, row 920 lists hats, and row 930 lists jackets. In certain embodiments, listing categories can be identified and used to classify items and/or pages.

Figure 10:
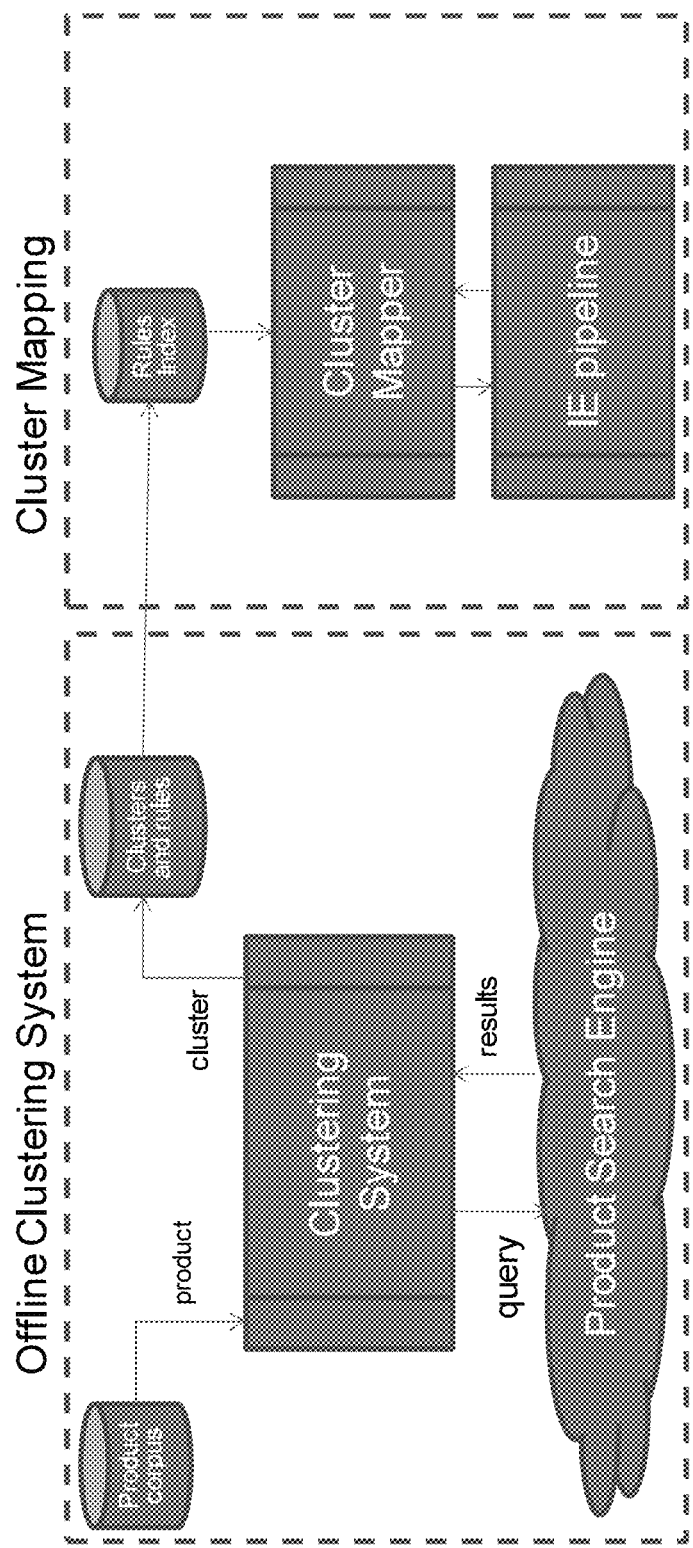
FIG. 10 illustrates an overview of an offline clustering system and a cluster mapping system.

With reference to FIG. 10, a high-level system diagram is illustrated that shows the relationship between an offline clustering system and a cluster mapping system. The clustering system may generate product clusters and mapping rules, and may run continuously on unclustered offers (i.e., new product offers that are discovered and added to the clustering system but have not yet been clustered into the existing clusters). New products may be added to or mapped to a cluster as those products are discovered. As discussed above, a cluster may group products or product offers together by features. For example, nouns, categories, brands, models, MPN, UPC, price range, etc., may be used to cluster products.

Figure 11:
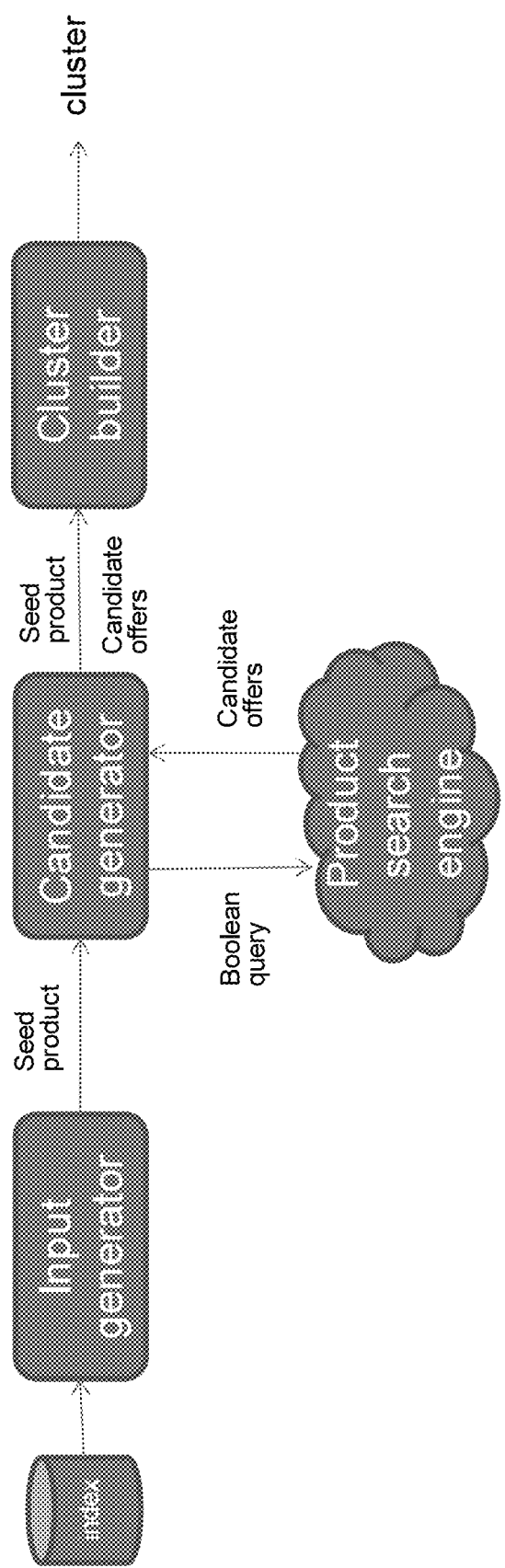
FIG. 11 illustrates the relationship between the input generator, candidate generator, cluster builder, and product search engine in a clustering system.

With reference to FIG. 11, a system diagram of a clustering system is illustrated, including an input generator, which generates an ordered list of seed products, a candidate generator, which generates queries to find products that are similar to the seed item, and a cluster builder, which builds a cluster from a set of products. A product search engine is also used to normalize queries and return responsive candidate offers.

In certain embodiments, the candidate generator of FIG. 11 may generate boolean search queries from seed products, and find products that match the query. For example, the query templates may take the following form:

(upc OR mpn OR model)
(upc OR mpn OR model) AND (noun OR brand)
(upc OR mpn OR model) AND (noun OR brand) AND terms)

Those of ordinary skill in the art will appreciate that these examples are only illustrative of the potential query templates that may be generated. In certain embodiments, the values of the template attribute may be selected from distinguishing terms from any attribute of a query. For example, terms from a title that are determined to distinguish that product from another product can be inserted into appropriate attributes.

In certain embodiments, the cluster builder receives a set of seed products and a set of candidate products as inputs. The cluster builder outputs a cluster of candidate products by, for example, finding the combination of attributes that accounts for the most products in the set of candidate products. For example, the joint assignment of noun, brand, MPN, UPC, and model that accounts for the most products can be used. Price outliers may be identified using a variant of inter-quartile ranges to eliminate outlying products.

In certain embodiments, the cluster rule mapping system receives products and a rules index as inputs. The cluster rule mapping system outputs mapped clusters. In certain embodiments, candidate clusters are determined for the input product. For each candidate cluster, the system checks if the input product matches the query for each cluster and scores the product against the cluster features. A decision tree rule is applied on the feature scores and a price filter is applied before the product is added to a cluster.

The teachings of the present disclosure may improve upon previous approaches including hierarchical agglomerative clustering (HAC), K-means, or mapping to external catalogs (e.g., CNET and other). HAC solutions may pose problems related to defining pair-wise similarity in noisy and missing data. Moreover, it is often difficult to identify representative products for merged products. K-means solutions often make it hard to identify the correct k-value to return the best data set. Centroid measurement and distance measurements are also difficult to compute.

In certain embodiments, a clustering system can be separated into two general parts: (1) a process for forming clusters (i.e., cluster generation or "clustering") and (2) a process for utilizing these clusters to map new incoming product items (i.e., cluster mapping). After clustering is performed, rules are loaded by another service called a cluster mapper. With the addition of incremental clustering, this rules-index is refreshed every day. Thus, all newly acquired product listings are sent to this cluster-mapper system that executes all previously generated cluster-rules on it. When a matching rule for the listing is found, the listing is mapped to that cluster. However, it is possible that none of the rules match, in which case a new product cluster is generated through the incremental clustering process. An example pseudo-code example of one implementation of a cluster mapping system is illustrated in FIG. 12. For example, a cluster mapper receives a product P and a rules index R for a set of clusters having a version V. At line 901, if the input product has a 'cluster id' attribute with a version number that matches version V of the rules index R, then the system returns. This line may serve as a check to ensure that the product has not already been mapped to an existing cluster. At line 902 and 903, if the product has not already been clustered, candidate clusters are identified for the input product. At line 904, the candidate clusters identified in line 903 are enumerated through and, at line 905, the boolean query for each candidate cluster is compared against the input product to determine whether the product satisfies the query. At line 906, the product is scored against the cluster to determine feature scores. At 907, a decision tree rule is applied on the features scores for the product and at line 908, a check is run against the product price to determine whether it is within the cluster price range. At line 909, the output mapped cluster id value is returned as the largest cluster.

In certain embodiments, cluster merging is applied to combine two or more similar product clusters. For example, when clusters are formed, two different clusters are formed for the same underlying product. Cluster maintenance processes, such as cluster merging, allow for identification of redundant or duplicate clusters that may not be identifiable upon cluster creation. For example, the redundancy of a particular cluster may only be identified after additional products are added to the clusters through incremental clustering operations. In certain embodiments, after clustering is performed, a cluster merging process is run that checks for near-duplicate clusters and merges them into one.

In particular embodiments, an advertisement may be text (which may be HTML-linked), one or more images (which may be HTML-linked), one or more videos, audio, other suitable digital object files, a suitable combination of these, or any other suitable advertisement in any suitable digital format presented on one or more web pages, in one or more e-mails, or in connection with search results requested by a user. In addition or as an alternative, an advertisement may be one or more sponsored stories (e.g., a news-feed or ticker item on social-networking system 160). A sponsored story may be a social action by a user (such as "liking" a page, "liking" or commenting on a post on a page, RSVPing to an event associated with a page, voting on a question posted on a page, checking in to a place, using an application or playing a game, or "liking" or sharing a website) that an advertiser promotes, for example, by having the social action presented within a pre-determined area of a profile page of a user or other page, presented with additional information associated with the advertiser, bumped up or otherwise highlighted within news feeds or tickers of other users, or otherwise promoted. The advertiser may pay to have the social action promoted. The social action may be promoted within or on social-networking system 160. In addition or as an alternative, the social action may be promoted outside or off of social-networking system 160, where appropriate. In particular embodiments, a page may be an on-line presence (such as a webpage or website within or outside of social-networking system 160) of a business, organization, or brand facilitating its sharing of stories and connecting with people. A page may be customized, for example, by adding applications, posting stories, or hosting events.

A sponsored story may be generated from stories in users' news feeds and promoted to specific areas within displays of users' web browsers when viewing a web page associated with social-networking system 160. Sponsored stories are more likely to be viewed by users, at least in part because sponsored stories generally involve interactions or suggestions by the users' friends, fan pages, or other connections. In connection with sponsored stories, particular embodiments may utilize one or more systems, components, elements, functions, methods, operations, or steps disclosed in U.S. patent application Ser. No. 13/327,557, entitled "Sponsored Stories Unit Creation from Organic Activity Stream" and filed 15 Dec. 2011, U.S. Patent Application Publication No. 2012/0203831, entitled "Sponsored Stories Unit Creation from Organic Activity Stream" and filed 3 Feb. 2012 as U.S. patent application Ser. No. 13/020,745, or U.S. Patent Application Publication No. 2012/0233009, entitled "Endorsement Subscriptions for Sponsored Stories" and filed 9 Mar. 2011 as U.S. patent application Ser. No. 13/044, 506, which are all incorporated herein by reference as an example and not by way of limitation. In particular embodiments, sponsored stories may utilize computer-vision algorithms to detect products in uploaded images or photos lacking an explicit connection to an advertiser as disclosed in U.S. patent application Ser. No. 13/212,356, entitled "Computer-Vision Content Detection for Sponsored Stories" and filed 18 Aug. 2011, which is incorporated herein by reference as an example and not by way of limitation.

As described above, an advertisement may be text (which may be HTML-linked), one or more images (which may be HTML-linked), one or more videos, audio, one or more ADOBE FLASH files, a suitable combination of these, or any other suitable advertisement in any suitable digital format. In particular embodiments, an advertisement may be requested for display within third-party webpages, social-networking-system webpages, or other pages. An advertisement may be displayed in a dedicated portion of a page, such as in a banner area at the top of the page, in a column at the side of the page, in a GUI of the page, in a pop-up window, over the top of content of the page, or elsewhere with respect to the page. In addition or as an alternative, an advertisement may be displayed within an application or within a game. An advertisement may be displayed within dedicated pages, requiring the user to interact with or watch the advertisement before the user may access a page, utilize an application, or play a game. The user may, for example view the advertisement through a web browser.

A user may interact with an advertisement in any suitable manner. The user may click or otherwise select the advertisement, and the advertisement may direct the user (or a browser or other application being used by the user) to a page associated with the advertisement. At the page associated with the advertisement, the user may take additional actions, such as purchasing a product or service associated with the advertisement, receiving information associated with the advertisement, or subscribing to a newsletter associated with the advertisement. An advertisement with audio or video may be played by selecting a component of the advertisement (like a "play button"). In particular embodiments, an advertisement may include one or more games, which a user or other application may play in connection with the advertisement. An advertisement may include functionality for responding to a poll or question in the advertisement.

An advertisement may include social-networking-system functionality that a user may interact with. For example, an advertisement may enable a user to "like" or otherwise endorse the advertisement by selecting an icon or link associated with endorsement. Similarly, a user may share the advertisement with another user (e.g., through social-networking system 160) or RSVP (e.g., through social-networking system 160) to an event associated with the advertisement. In addition or as an alternative, an advertisement may include social-networking-system content directed to the user. For example, an advertisement may display information about a friend of the user within social-networking system 160 who has taken an action associated with the subject matter of the advertisement.

Social-networking-system functionality or content may be associated with an advertisement in any suitable manner. For example, an advertising system (which may include hardware, software, or both for receiving bids for advertisements and selecting advertisements in response) may retrieve social-networking functionality or content from social-networking system 160 and incorporate the retrieved social-networking functionality or content into the advertisement before serving the advertisement to a user. Examples of selecting and providing social-networking-system functionality or content with an advertisement are disclosed in U.S. Patent Application Publication No. 2012/0084160, entitled "Providing Social Endorsements with Online Advertising" and filed 5 Oct. 2010 as U.S. patent application Ser. No. 12/898,662, and in U.S. Patent Application Publication No. 2012/0232998, entitled "Selecting Social Endorsement Information for an Advertisement for Display to a Viewing User" and filed 8 Mar. 2011 as U.S. patent application Ser. No. 13/043,424, which are both incorporated herein by reference as examples only and not by way of limitation. Interacting with an advertisement that is associated with social-networking-system functionality or content may cause information about the interaction to be displayed in a profile page of the user in social-networking-system 160.

Particular embodiments may facilitate the delivery of advertisements to users that are more likely to find the advertisements more relevant or useful. For example, an advertiser may realize higher conversion rates (and therefore higher return on investment (ROI) from advertising) by identifying and targeting users that are more likely to find its advertisements more relevant or useful. The advertiser may use user-profile information in social-networking system 160 to identify those users. In addition or as an alternative, social-networking system 160 may use user-profile information in social-networking system 160 to identify those users for the advertiser. As examples and not by way of limitation, particular embodiments may target users with the following: invitations or suggestions of events; suggestions regarding coupons, deals, or wish-list items; suggestions regarding friends' life events; suggestions regarding groups; advertisements; or social advertisements. Such targeting may occur, where appropriate, on or within social-networking system 160, off or outside of social-networking system 160, or on mobile computing devices of users. When on or within social-networking system 160, such targeting may be directed to users' news feeds, search results, e-mail or other in-boxes, or notifications channels or may appear in particular area of web pages of social-networking system 160, such as a right-hand side of a web page in a concierge or grouper area (which may group along a right-hand rail advertisements associated with the same concept, node, or object) or a network-ego area (which may be based on what a user is viewing on the web page and a current news feed of the user). When off or outside of social-networking system 160, such targeting may be provided through a third-party website, e.g., involving an ad exchange or a social plug-in. When on a mobile computing device of a user, such targeting may be provided through push notifications to the mobile computing device.

Targeting criteria used to identify and target users may include explicit, stated user interests on social-networking system 160 or explicit connections of a user to a node, object, entity, brand, or page on social-networking system 160. In addition or as an alternative, such targeting criteria may include implicit or inferred user interests or connections (which may include analyzing a user's history, demographic, social or other activities, friends' social or other activities, subscriptions, or any of the preceding of other users similar to the user (based, e.g., on shared interests, connections, or events)). Particular embodiments may utilize platform targeting, which may involve platform and "like" impression data; contextual signals (e.g., "Who is viewing now or has viewed recently the page for COCA-COLA?"); light-weight connections (e.g., "check-ins"); connection lookalikes; fans; extracted keywords; EMU advertising; inferential advertising; coefficients, affinities, or other social-graph information; friends-of-friends connections; pinning or boosting; deals; polls; household income, social clusters or groups; products detected in images or other media; social- or open-graph edge types; geo-prediction; views of profile or pages; status updates or other user posts (analysis of which may involve natural-language processing or keyword extraction); events information; or collaborative filtering. Identifying and targeting users may also include privacy settings (such as user opt-outs), data hashing, or data anonymization, as appropriate.

To target users with advertisements, particular embodiments may utilize one or more systems, components, elements, functions, methods, operations, or steps disclosed in the following, which are all incorporated herein by reference as examples and not by way of limitation: U.S. Patent Application Publication No. 2009/0119167, entitled "Social Advertisements and Other Informational Messages on a Social Networking Website and Advertising Model for Same" and filed 18 Aug. 2008 as U.S. patent application Ser. No. 12/193,702; U.S. Patent Application Publication No. 2009/0070219, entitled "Targeting Advertisements in a Social Network" and filed 20 Aug. 2008 as U.S. patent application Ser. No. 12/195,321; U.S. Patent Application Publication No. 2012/0158501, entitled "Targeting Social Advertising to Friends of Users Who Have Interacted With an Object Associated with the Advertising" and filed 15 Dec. 2010 as U.S. patent application Ser. No. 12/968,786; or U.S. Patent Application Publication No. 2012/0166532, entitled "Contextually Relevant Affinity Prediction in a Social-Networking System" and filed 23 Dec. 2010 as U.S. patent application Ser. No. 12/978,265.

An advertisement may be presented or otherwise delivered using plug-ins for web browsers or other applications, iframe elements, news feeds, tickers, notifications (which may include, for example, e-mail, Short Message Service (SMS) messages, or notifications), or other means. An advertisement may be presented or otherwise delivered to a user on a mobile or other computing device of the user. In connection with delivering advertisements, particular embodiments may utilize one or more systems, components, elements, functions, methods, operations, or steps disclosed in the following, which are all incorporated herein by reference as examples and not by way of limitation: U.S. Patent Application Publication No. 2012/0159635, entitled "Comment Plug-In for Third-Party System" and filed 15 Dec. 2010 as U.S. patent application Ser. No. 12/969,368; U.S. Patent Application Publication No. 2012/0158753, entitled "Comment Ordering System" and filed 15 Dec. 2010 as U.S. patent application Ser. No. 12/969,408; U.S. Pat. No. 7,669,123, entitled "Dynamically Providing a News Feed About a User of a Social Network" and filed 11 Aug. 2006 as U.S. patent application Ser. No. 11/503,242; U.S. Pat. No. 8,402,094, entitled "Providing a Newsfeed Based on User Affinity for Entities and Monitored Actions in a Social Network Environment" and filed 11 Aug. 2006 as U.S. patent application Ser. No. 11/503,093; U.S. Patent Application Publication No. 2012/0072428, entitled "Action Clustering for News Feeds" and filed 16 Sep. 2010 as U.S. patent application Ser. No. 12/884,010; U.S. Patent Application Publication No. 2011/0004692, entitled "Gathering Information about Connections in a Social Networking Service" and filed 1 Jul. 2009 as U.S. patent application Ser. No. 12/496,606; U.S. Patent Application Publication No. 2008/0065701, entitled "Method and System for Tracking Changes to User Content in an Online Social Network" and filed 12 Sep. 2006 as U.S. patent application Ser. No. 11/531,154; U.S. Patent Application Publication No. 2008/0065604, entitled "Feeding Updates to Landing Pages of Users of an Online Social Network from External Sources" and filed 17 Jan. 2007 as U.S. patent application Ser. No. 11/624,088; U.S. Pat. No. 8,244,848, entitled "Integrated Social-Network Environment" and filed 19 Apr. 2010 as U.S. patent application Ser. No. 12/763,171; U.S. Patent Application Publication No. 2011/0083101, entitled "Sharing of Location-Based Content Item in Social-Networking Service" and filed 6 Oct. 2009 as U.S. patent application Ser. No. 12/574,614; U.S. Pat. No. 8,150,844, entitled "Location Ranking Using Social-Graph Information" and filed 18 Aug. 2010 as U.S. patent application Ser. No. 12/858,718; U.S. patent application Ser. No. 13/051,286, entitled "Sending Notifications to Users Based on Users' Notification Tolerance Levels" and filed 18 Mar. 2011; U.S. patent application Ser. No. 13/096,184, entitled "Managing Notifications Pushed to User Devices" and filed 28 Apr. 2011; U.S. patent application Ser. No. 13/276,248, entitled "Platform-Specific Notification Delivery Channel" and filed 18 Oct. 2011; or U.S. Patent Application Publication No. 2012/0197709, entitled "Mobile Advertisement with Social Component for Geo-Social Networking System" and filed 1 Feb. 2011 as U.S. patent application Ser. No. 13/019,061. Although this disclosure describes or illustrates particular advertisements being delivered in particular ways and in connection with particular content, this disclosure contemplates any suitable advertisements delivered in any suitable ways and in connection with any suitable content.

In particular embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page that identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example and not by way of limitation, a particular concept node 204 corresponding to a particular photo may have a privacy setting specifying that the photo may only be accessed by users tagged in the photo and their friends. In particular embodiments, privacy settings may allow users to opt in or opt out of having their actions logged by the social-networking system 160 or shared with other systems (e.g., a third-party system 170). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems 170, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers 162 may be authorization/privacy servers for enforcing privacy settings. In response to a request from a user (or other entity) for a particular object stored in a data store 164, the social-networking system 160 may send a request to the data store 164 for the object. The request may identify the user associated with the request and may only be sent to the user (or a client system 130 of the user) if the authorization server determines that the user is authorized to access the object based on the privacy settings associated with the object. If the requesting user is not authorized to access the object, the authorization server may prevent the requested object from being retrieved from the data store 164, or may prevent the requested object from be sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

Figure 13:
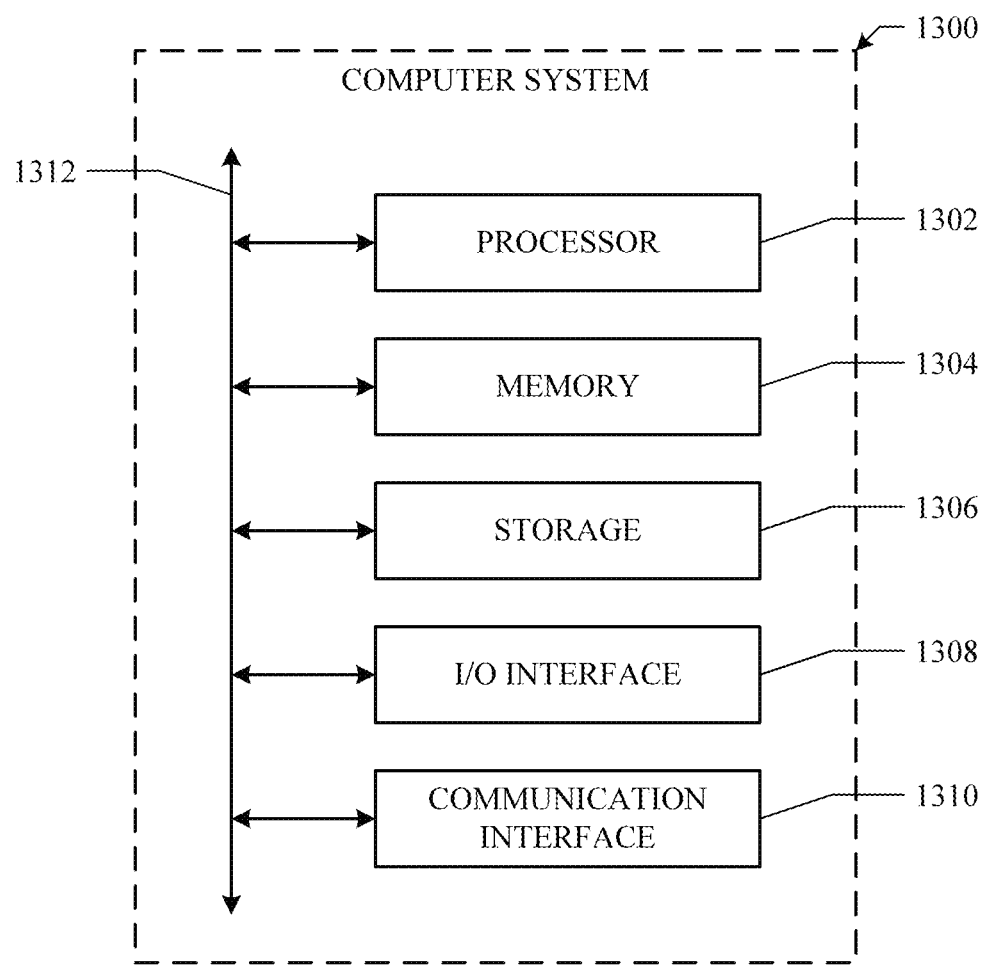
FIG. 13 illustrates an example computer system.

FIG. 13 illustrates an example computer system 1300. In particular embodiments, one or more computer systems 1300 perform one or more steps of one or more methods described or illustrated herein. In particular embodiments, one or more computer systems 1300 provide functionality described or illustrated herein. In particular embodiments, software running on one or more computer systems 1300 performs one or more steps of one or more methods described or illustrated herein or provides functionality described or illustrated herein. Particular embodiments include one or more portions of one or more computer systems 1300. Herein, reference to a computer system may encompass a computing device, and vice versa, where appropriate. Moreover, reference to a computer system may encompass one or more computer systems, where appropriate.

This disclosure contemplates any suitable number of computer systems 1300. This disclosure contemplates computer system 1300 taking any suitable physical form. As example and not by way of limitation, computer system 1300 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 1300 may include one or more computer systems 1300; be unitary or distributed; span multiple locations; span multiple machines; span multiple data centers; or reside in a cloud, which may include one or more cloud components in one or more networks. Where appropriate, one or more computer systems 1300 may perform without substantial spatial or temporal limitation one or more steps of one or more methods described or illustrated herein. As an example and not by way of limitation, one or more computer systems 1300 may perform in real time or in batch mode one or more steps of one or more methods described or illustrated herein. One or more computer systems 1300 may perform at different times or at different locations one or more steps of one or more methods described or illustrated herein, where appropriate.

In particular embodiments, computer system 1300 includes a processor 1302, memory 1304, storage 1306, an input/output (I/O) interface 1308, a communication interface 1310, and a bus 1312. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1302 includes hardware for executing instructions, such as those making up a computer program. As an example and not by way of limitation, to execute instructions, processor 1302 may retrieve (or fetch) the instructions from an internal register, an internal cache, memory 1304, or storage 1306; decode and execute them; and then write one or more results to an internal register, an internal cache, memory 1304, or storage 1306. In particular embodiments, processor 1302 may include one or more internal caches for data, instructions, or addresses. This disclosure contemplates processor 1302 including any suitable number of any suitable internal caches, where appropriate. As an example and not by way of limitation, processor 1302 may include one or more instruction caches, one or more data caches, and one or more translation lookaside buffers (TLBs). Instructions in the instruction caches may be copies of instructions in memory 1304 or storage 1306, and the instruction caches may speed up retrieval of those instructions by processor 1302. Data in the data caches may be copies of data in memory 1304 or storage 1306 for instructions executing at processor 1302 to operate on; the results of previous instructions executed at processor 1302 for access by subsequent instructions executing at processor 1302 or for writing to memory 1304 or storage 1306; or other suitable data. The data caches may speed up read or write operations by processor 1302. The TLBs may speed up virtual-address translation for processor 1302. In particular embodiments, processor 1302 may include one or more internal registers for data, instructions, or addresses. This disclosure contemplates processor 1302 including any suitable number of any suitable internal registers, where appropriate. Where appropriate, processor 1302 may include one or more arithmetic logic units (ALUs); be a multi-core processor; or include one or more processors 1302. Although this disclosure describes and illustrates a particular processor, this disclosure contemplates any suitable processor.

In particular embodiments, memory 1304 includes main memory for storing instructions for processor 1302 to execute or data for processor 1302 to operate on. As an example and not by way of limitation, computer system 1300 may load instructions from storage 1306 or another source (such as, for example, another computer system 1300) to memory 1304. Processor 1302 may then load the instructions from memory 1304 to an internal register or internal cache. To execute the instructions, processor 1302 may retrieve the instructions from the internal register or internal cache and decode them. During or after execution of the instructions, processor 1302 may write one or more results (which may be intermediate or final results) to the internal register or internal cache. Processor 1302 may then write one or more of those results to memory 1304. In particular embodiments, processor 1302 executes only instructions in one or more internal registers or internal caches or in memory 1304 (as opposed to storage 1306 or elsewhere) and operates only on data in one or more internal registers or internal caches or in memory 1304 (as opposed to storage 1306 or elsewhere). One or more memory buses (which may each include an address bus and a data bus) may couple processor 1302 to memory 1304. Bus 1312 may include one or more memory buses, as described below. In particular embodiments, one or more memory management units (MMUs) reside between processor 1302 and memory 1304 and facilitate accesses to memory 1304 requested by processor 1302. In particular embodiments, memory 1304 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1304 may include one or more memories 1304, where appropriate. Although this disclosure describes and illustrates particular memory, this disclosure contemplates any suitable memory.

In particular embodiments, storage 1306 includes mass storage for data or instructions. As an example and not by way of limitation, storage 1306 may include a hard disk drive (HDD), a floppy disk drive, flash memory, an optical disc, a magneto-optical disc, magnetic tape, or a Universal Serial Bus (USB) drive or a combination of two or more of these. Storage 1306 may include removable or non-removable (or fixed) media, where appropriate. Storage 1306 may be internal or external to computer system 1300, where appropriate. In particular embodiments, storage 1306 is non-volatile, solid-state memory. In particular embodiments, storage 1306 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1306 taking any suitable physical form. Storage 1306 may include one or more storage control units facilitating communication between processor 1302 and storage 1306, where appropriate. Where appropriate, storage 1306 may include one or more storages 1306. Although this disclosure describes and illustrates particular storage, this disclosure contemplates any suitable storage.

In particular embodiments, I/O interface 1308 includes hardware, software, or both, providing one or more interfaces for communication between computer system 1300 and one or more I/O devices. Computer system 1300 may include one or more of these I/O devices, where appropriate. One or more of these I/O devices may enable communication between a person and computer system 1300. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1308 for them. Where appropriate, I/O interface 1308 may include one or more device or software drivers enabling processor 1302 to drive one or more of these I/O devices. I/O interface 1308 may include one or more I/O interfaces 1308, where appropriate. Although this disclosure describes and illustrates a particular I/O interface, this disclosure contemplates any suitable I/O interface.

In particular embodiments, communication interface 1310 includes hardware, software, or both providing one or more interfaces for communication (such as, for example, packet-based communication) between computer system 1300 and one or more other computer systems 1300 or one or more networks. As an example and not by way of limitation, communication interface 1310 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1310 for it. As an example and not by way of limitation, computer system 1300 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1300 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1300 may include any suitable communication interface 1310 for any of these networks, where appropriate. Communication interface 1310 may include one or more communication interfaces 1310, where appropriate. Although this disclosure describes and illustrates a particular communication interface, this disclosure contemplates any suitable communication interface.

In particular embodiments, bus 1312 includes hardware, software, or both coupling components of computer system 1300 to each other. As an example and not by way of limitation, bus 1312 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1312 may include one or more buses 1312, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising:
by one or more processors, receiving an initial set of normalized attribute values that define a particular item being offered and a corresponding threshold score for each of the normalized attribute values in the initial set;
by the one or more processors, generating a document object model (DOM) structure of a first webpage;
by the one or more processors, identifying a plurality of attribute values of a candidate item listing in the first webpage by traversing up the DOM from a designated pivot item associated with the candidate item listing in the DOM;
by the one or more processors, for each attribute value of the candidate item listing:
determining a score for the attribute value based on whether it matches a corresponding normalized attribute value in the initial set; and
determining whether the score is above or below the corresponding threshold score for the normalized attribute value in the initial set;
by the one or more processors, determining that the candidate item listing describes the particular item being offered based on a set of rules that define an acceptable number of scores that are allowed to be below corresponding threshold scores;
by the one or more processors, adding the attribute values of the candidate item to the initial set of normalized attribute values to create a modified set of normalized attribute values that define the particular item; and
by the one or more processors, crawling a second webpage to identify additional candidate item listings for the particular item being offered based on the modified set of normalized attribute values.

2. The method of claim 1, wherein the candidate item listing is extracted from an unstructured document associated with an item listing page.

3. The method of claim 1, further comprising a table listing each determined score for a set of item listings that are associated with the item being offered.

4. The method of claim 1, wherein each threshold score comprises a high score and a low score, and wherein the determining whether the score is above or below the corresponding threshold score comprises evaluating whether each score is above the low score and below the high score.

5. The method of claim 1, wherein determining whether the candidate item listing describes the particular item being offered is further based on whether a price attribute value is within a range of prices associated with the particular item being offered.

6. The method of claim 1, wherein the particular item being offered is a product, and wherein the normalized attribute values define common attribute values associated with product listings associated with the product.

7. The method of claim 1, wherein the initial set of normalized attribute values are selected from a group comprising:
brand;
manufacturer's part number; and
title.

8. The method of claim 1, further comprising:
determining an affinity between a user of a social-networking system and the particular item being offered;
determining that the particular item being offered is related to the candidate item listing; and
displaying the candidate item listing to the user.

9. The method of claim 8, wherein determining that the particular item being offered is related to the candidate item listing comprises determining whether a content page associated with the candidate item listing is also associated with the particular item being offered.

10. One or more computer-readable non-transitory storage media embodying software that is operable when executed to:
receive an initial set of normalized attribute values that define a particular item being offered and a corresponding threshold score for each of the normalized attribute values in the initial set;
generate a document object model (DOM) structure of a first webpage;
identify a plurality of attribute values of a candidate item listing in the first webpage by traversing up the DOM from a designated pivot item associated with the candidate item listing in the DOM;
for each attribute value of the candidate item listing:
determine a score for the attribute value based on whether it matches a corresponding normalized attribute value in the initial set; and
determine whether the score is above or below the corresponding threshold score for the normalized attribute value in the initial set;
determine that the candidate item listing describes the particular item being offered based on a set of rules that define an acceptable number of scores that are allowed to be below corresponding threshold scores;
add the attribute values of the candidate item to the initial set of normalized attribute values to create a modified set of normalized attribute values that define the particular item; and
crawl a second webpage to identify additional candidate item listings for the particular item being offered based on the modified set of normalized attribute values.

11. The one or more computer-readable non-transitory storage media of claim 10, wherein the candidate item listing is extracted from an unstructured document associated with an item listing page.

12. The one or more computer-readable non-transitory storage media of claim 10, further comprising a table listing each determined score for a set of item listings that are associated with the item being offered.

13. The one or more computer-readable non-transitory storage media of claim 10, wherein each threshold score comprises a high score and a low score, and wherein the determining whether the score is above or below the corresponding threshold score comprises evaluating whether each score is above the low score and below the high score.

14. The one or more computer-readable non-transitory storage media of claim 10, wherein determining whether the candidate item listing describes the particular item being offered is further based on whether a price attribute value is within a range of prices associated with the particular item being offered.

15. The one or more computer-readable non-transitory storage media of claim 10, wherein the particular item being offered is a product, and wherein the normalized attribute values define common attribute values associated with product listings associated with the product.

16. The one or more computer-readable non-transitory storage media of claim 10, wherein the initial set of normalized attribute values are selected from a group comprising:
brand;
manufacturer's part number; and
title.

17. The one or more computer-readable non-transitory storage media of claim 10, further comprising:
determining an affinity between a user of a social-networking system and the particular item being offered;
determining that the particular item being offered is related to the candidate item listing; and
displaying the candidate item listing to the user.

18. The one or more computer-readable non-transitory storage media of claim 17, wherein determining that the particular item being offered is related to the candidate item listing comprises determining whether a content page associated with the candidate item listing is also associated with the particular item being offered.

19. A system comprising: one or more processors; and a non-transitory memory coupled to the one or more processors comprising instructions executable by the one or more processors, the one or more processors operable when executing the instructions to:
receive an initial set of normalized attribute values that define a particular item being offered and a corresponding threshold score for each of the normalized attribute values in the initial set;
generate a document object model (DOM) structure of a first webpage;
identify a plurality of attribute values of a candidate item listing in the first webpage by traversing up the DOM from a designated pivot item associated with the candidate item listing in the DOM;
for each attribute value of the candidate item listing:
determine a score for the attribute value based on whether it matches a corresponding normalized attribute value in the initial set; and
determine whether the score is above or below the corresponding threshold score for the normalized attribute value in the initial set;
determine that the candidate item listing describes the particular item being offered based on a set of rules that define an acceptable number of scores that are allowed to be below corresponding threshold scores;
add the attribute values of the candidate item to the initial set of normalized attribute values to create a modified set of normalized attribute values that define the particular item; and
crawl a second webpage to identify additional candidate item listings for the particular item being offered based on the modified set of normalized attribute values.

20. The system of claim 19, wherein the candidate item listing is extracted from an unstructured document associated with an item listing page.

* * * * *